US011874895B2

(12) United States Patent
Guo et al.

(10) Patent No.: US 11,874,895 B2
(45) Date of Patent: *Jan. 16, 2024

(54) METHODS AND APPARATUS FOR JOB SCHEDULING IN A PROGRAMMABLE MIXED-RADIX DFT/IDFT PROCESSOR

(71) Applicant: MARVELL ASIA PTE. LTD., Singapore (SG)

(72) Inventors: Yuanbin Guo, Mountain House, CA (US); Hong Jik Kim, San Jose, CA (US)

(73) Assignee: Marvell Asia Pte, Ltd, Singapore (SG)

( * ) Notice: Subject to any disclaimer, the term of this patent is extended or adjusted under 35 U.S.C. 154(b) by 410 days.

This patent is subject to a terminal disclaimer.

(21) Appl. No.: 17/117,006

(22) Filed: Dec. 9, 2020

(65) Prior Publication Data
US 2021/0089609 A1 Mar. 25, 2021

Related U.S. Application Data

(63) Continuation of application No. 16/173,877, filed on Oct. 29, 2018, now Pat. No. 10,878,060, which is a (Continued)

(51) Int. Cl.
G06F 17/14 (2006.01)
G06F 17/16 (2006.01)
H04W 16/18 (2009.01)

(52) U.S. Cl.
CPC .......... *G06F 17/141* (2013.01); *G06F 17/142* (2013.01); *G06F 17/16* (2013.01); *H04W 16/18* (2013.01)

(58) Field of Classification Search
CPC ...... G06F 17/141; G06F 17/142; G06F 17/16; H04W 16/18
(Continued)

(56) References Cited

U.S. PATENT DOCUMENTS

2010/0191791 A1 7/2010 Patel
2017/0220523 A1* 8/2017 Nekuii .................. G06F 17/142

OTHER PUBLICATIONS

Zeke Wang, Xue Liu, Bingstleng He, and Feng Yu, A Combined SDC-SDF Architecture for Normal 1/0 Pipelined Radix-2 FFT, IEEE Transactions on Very Large Scale Integration (VLSI) Systems, vol. 23 No. 5, (May 2015).
(Continued)

*Primary Examiner* — Tan V Mai
(74) *Attorney, Agent, or Firm* — JW Law Group; James M. Wu

(57) ABSTRACT

Methods and apparatus for job scheduling in a programmable mixed-radix DFT/IDFT processor. In an exemplary embodiment, a method includes receiving a plurality of discrete Fourier transform (DFT) jobs. Each job identifies a computation of a DFT of a particular point size. The method also includes bundling selected jobs having a selected point size into a mega-job, and identifying a radix factorization for the selected point size. The radix factorization includes one or more stages and each stage identifies a radix computation to be performed. The method also includes computing, for each stage, the identified radix computations for the selected jobs in the mega-job. The radix computations for each stage are performed for the selected jobs before performing radix computations for a subsequent stage. The method also includes outputting DFT results for the selected jobs in the mega-job.

24 Claims, 16 Drawing Sheets

Related U.S. Application Data continuation-in-part of application No. 15/272,332, filed on Sep. 21, 2016, now Pat. No. 10,210,135.

(60) Provisional application No. 62/662,438, filed on Apr. 25, 2018, provisional application No. 62/279,345, filed on Jan. 15, 2016, provisional application No. 62/274,686, filed on Jan. 4, 2016, provisional application No. 62/274,062, filed on Dec. 31, 2015.

(58) Field of Classification Search
USPC ........................................................ 708/405
See application file for complete search history.

(56) References Cited

OTHER PUBLICATIONS

Madimir Stojanovic, Fast Fourier Transform: VLSI Architectures, course materials for 6.973 Communication System Design, Spring 2006.MIT OpenCourseWare, Massachusetts Institute of Technology.

Brett W. Dickson and Albert A. Conti, Parallel Extensions to Single-Patti Delay-Feedback FFT Architectures, 2014, Ttle MITRE Corporation (Online Publication).

\* cited by examiner

300

| INDEX | 34 | 33 | 32 | 31 | 30 | 29 | 28 |
|---|---|---|---|---|---|---|---|
| $N_{RB}^{UL}$ | 108 | 100 | 96 | 90 | 81 | 80 | 75 |
| N_DFT | 1296 | 1200 | 1152 | 1080 | 972 | 960 | 900 |

| INDEX | 27 | 26 | 25 | 24 | 23 | 22 | 21 |
|---|---|---|---|---|---|---|---|
| $N_{RB}^{UL}$ | 72 | 64 | 60 | 54 | 50 | 48 | 45 |
| N_DFT | 864 | 768 | 720 | 648 | 600 | 576 | 540 |

| INDEX | 20 | 19 | 18 | 17 | 16 | 15 | 14 |
|---|---|---|---|---|---|---|---|
| $N_{RB}^{UL}$ | 40 | 36 | 32 | 30 | 27 | 25 | 24 |
| N_DFT | 480 | 432 | 384 | 360 | 324 | 300 | 288 |

| INDEX | 13 | 12 | 11 | 10 | 9 | 8 | 7 |
|---|---|---|---|---|---|---|---|
| $N_{RB}^{UL}$ | 20 | 18 | 16 | 15 | 12 | 10 | 9 |
| N_DFT | 240 | 216 | 192 | 180 | 144 | 120 | 108 |

| INDEX | 6 | 5 | 4 | 3 | 2 | 1 | 0 |
|---|---|---|---|---|---|---|---|
| $N_{RB}^{UL}$ | 8 | 6 | 5 | 4 | 3 | 2 | 1 |
| N_DFT | 96 | 72 | 60 | 48 | 36 | 24 | 12 |

FIG. 3

METHODS AND APPARATUS FOR JOB SCHEDULING IN A PROGRAMMABLE MIXED-RADIX DFT/IDFT PROCESSOR

PRIORITY

This application is a continuation of a U.S. patent application having a Ser. No. 16/173,877 filed on Oct. 29, 2018, entitled "Methods and Apparatus for Job Scheduling in A Programmable Mixed-Radix DFT/IDFT Processor, " which has been issued with a U.S. Pat. No. 10,878,060 on Dec. 29, 2020, which claims the benefit of priority based upon U.S. Provisional Patent Application having Application No. 62/662,438, filed on Apr. 25, 2018, and entitled "METHOD AND APPARATUS FOR JOB SCHEDULER IN A VECTOR DFT/IDFT PROCESSOR FOR SMALL BLOCK SIZES". The application having a Ser. No. 16/173,877 is also a continuation-in-part (CIP) of application Ser. No. 15/272,332 filed on Sep. 21, 2016 and entitled "Methods and Apparatus for Providing A Programmable Mixed-Radix DFT/IDFT Processor Using Vector Engines," which has been issued with a U.S. Pat. No. 10,114,797 on Oct. 30, 2018. The application having a Ser. No. 15/272,332 further claims the benefit of priority based upon U.S. Provisional Patent Application having Application No. 62/274,062, filed on Dec. 31, 2015, and entitled "METHOD AND APPARATUS FOR PROVIDING PROGRAMMABLE MIXED RADIX DFT PROCESSOR USING VECTOR ENGINES" and U.S. Provisional Patent Application having Application No. 62/274,686, filed on Jan. 4, 2016, and entitled "METHOD AND APPARATUS FOR DYNAMICALLY GENERATING MIXED-RADIX TWIDDLE COEFFICIENT VECTORS" and U.S. Provisional Patent Application having Application No. 62/279,345, filed on Jan. 15, 2016, and entitled "METHOD AND APPARATUS FOR PROVIDING PROGRAMMABLE MIXED-RADIX DFT/IDFT PROCESSOR USING VECTOR MEMORY SUBSYSTEM."

All mentioned U.S. applications and/or patents are hereby incorporated by reference.

FIELD

The exemplary embodiments of the present invention relate to the design and operation of telecommunications networks. More specifically, the exemplary embodiments of the present invention relate to receiving and processing data streams in a wireless communication network.

BACKGROUND

There is a rapidly growing trend for mobile and remote data access over a high-speed communication network, such as 3G or 4G cellular networks. However, accurately delivering and deciphering data streams over these networks has become increasingly challenging and difficult. High-speed communication networks which are capable of delivering information include, but are not limited to, wireless networks, cellular networks, wireless personal area networks ("WPAN"), wireless local area networks ("WLAN"), wireless metropolitan area networks ("MAN"), or the like. While WPAN can be Bluetooth or ZigBee, WLAN may be a Wi-Fi network in accordance with IEEE 802.11 WLAN standards.

To communicate high speed data over a communication network, such as a long-term evolution (LTE) communication or fifth generation (5G) cellular network, the network needs to support many configurations and process data utilizing different FFT sizes. A variety of architectures have been proposed for pipelined FFT processing that are capable of processing an uninterrupted stream of input data samples while producing a stream of output data samples at a matching rate. However, these architectures typically utilize multiple stages of FFT radix processors organized in a pipelined mode. The data is streamed into a first stage to complete a first radix operation and then the data is stream to subsequent stages for subsequent radix operations.

Thus, conventional pipelined architectures utilize multiple physical radix processors laid out in series to create the pipeline for streaming in/out data. The number of stages utilized is determined by the largest FFT size to be supported. However, this design becomes more complex when processing a variety of FFT sizes that require mixed-radix (2, 3, 4, 5, and 6) processing typically used in cellular (e.g., LTE) transceivers. As a result, the drawbacks of conventional systems are not only the amount of hardware resources utilized, but also the difficulty to configure such a system with the many different FFT sizes and mixed-radix factorization schemes utilized in an LTE transceiver.

Therefore, it is desirable to have a pipelined FFT architecture that is faster and consumes fewer resources than conventional systems. The architecture should have a higher performance to power/area ratio than the conventional architectures, and achieve much higher scalability and programmability for all possible mix-radix operations.

SUMMARY

The following summary illustrates simplified versions of one or more aspects of present invention. The purpose of this summary is to present some concepts in a simplified description as more detailed descriptions are provided below.

A programmable vector processor ("PVP") capable of calculating discrete Fourier transform ("DFT") values is disclosed. The PVP includes a ping-pong vector memory bank, a twiddle factor generator, and a programmable vector mixed radix engine that communicate data through a vector pipeline. The ping-pong vector memory bank is able to store input data and feedback data with optimal storage contention. The twiddle factor generator generates various twiddle values for DFT calculations. The programmable vector mixed radix engine is configured to provide one of multiple DFT radix results. For example, the programmable vector mixed radix engine can be programmed to perform radix3, radix4, radix 5 and radix6 DFT calculations. In one embodiment, the PVP also includes a vector memory address generator for producing storage addresses, and a vector dynamic scaling factor calculator capable of determining scaling values.

In an exemplary embodiment, a job scheduler is provided to schedule jobs to be efficiently computed by a programmable vector processor having a configurable vector mixed-radix engine with iterative pipeline. The job scheduler bundles DFT job of the same point size to be efficiently computed by the programmable vector processor. Since the jobs have the same point size and are sequentially computed stage by stage, the overhead for reconfiguring the programmable vector processor is significantly reduced, thereby resulting in increased efficiency.

In an exemplary embodiment, an apparatus includes a vector memory bank and a vector data path pipeline coupled to the vector memory bank. The apparatus also includes a configurable mixed radix engine coupled to the vector data path pipeline. The configurable mixed radix engine is configurable to perform a selected radix computation selected from a plurality of radix computations. The configurable mixed radix engine performs the selected radix computation on data received from the vector memory bank through the vector pipeline to generate a radix result. The apparatus also includes a controller that controls how many radix computation iterations will be performed to compute an N-point DFT based on a radix factorization.

In an exemplary embodiment, a method for performing an N-point DFT is disclosed. The method includes determining a radix factorization to compute the N-point DFT, the radix factorization determines one or more stages of radix calculations to be performed. The method also includes performing an iteration for each radix calculation. Each iteration includes reading data from a vector memory bank into a vector data path pipeline, configuring a configurable mixed radix engine to perform a selected radix calculation, performing the selected radix calculation on the data in the vector data path pipeline, storing a radix result of the selected radix calculation back into the vector memory bank, if the current iteration is not the last iteration, and outputting the radix result of the selected radix calculation as the N-point DFT result, if the current iteration is the last iteration.

In an exemplary embodiment, a method for job scheduling in a programmable mixed-radix DFT/IDFT processor is disclosed. The method includes receiving a plurality of discrete Fourier transform (DFT) jobs. Each job identifies a computation of a DFT of a particular point size. The method also includes bundling selected jobs having a selected point size into a mega-job, and identifying a radix factorization for the selected point size. The radix factorization includes one or more stages and each stage identifies a radix computation to be performed. The method also includes computing, for each stage, the identified radix computations for the selected jobs in the mega-job. The radix computations for each stage are performed for the selected jobs before performing radix computations for a subsequent stage. The method also includes outputting DFT results for the selected jobs in the mega-job.

In an exemplary embodiment, an apparatus for job scheduling in a programmable mixed-radix DFT/IDFT processor is disclosed. The apparatus includes a job scheduler that receives a plurality of discrete Fourier transform (DFT) jobs. Each job identifies a computation of an FFT of a particular point size, and the job scheduler bundles selected jobs having a selected point size into a mega-job. The apparatus also includes a state machine that identifies a radix factorization for the selected point size. The radix factorization includes one or more stages and each stage identifies a radix computation to be performed. The apparatus also includes a programmable mixed radix engine that computes, for each stage, the identified radix computations for the selected jobs in the mega-job. The radix computations for each stage are performed for the selected jobs before performing the radix computations for a subsequent stage. The apparatus also includes an output buffer that outputs FFT results for the selected jobs in the mega-job.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

FIG. 3 is a table showing DFT/IDFT sizes with respect to index and resource block ("RB") allocations in accordance with exemplary embodiments of the present invention;

DETAILED DESCRIPTION

Figure 1:
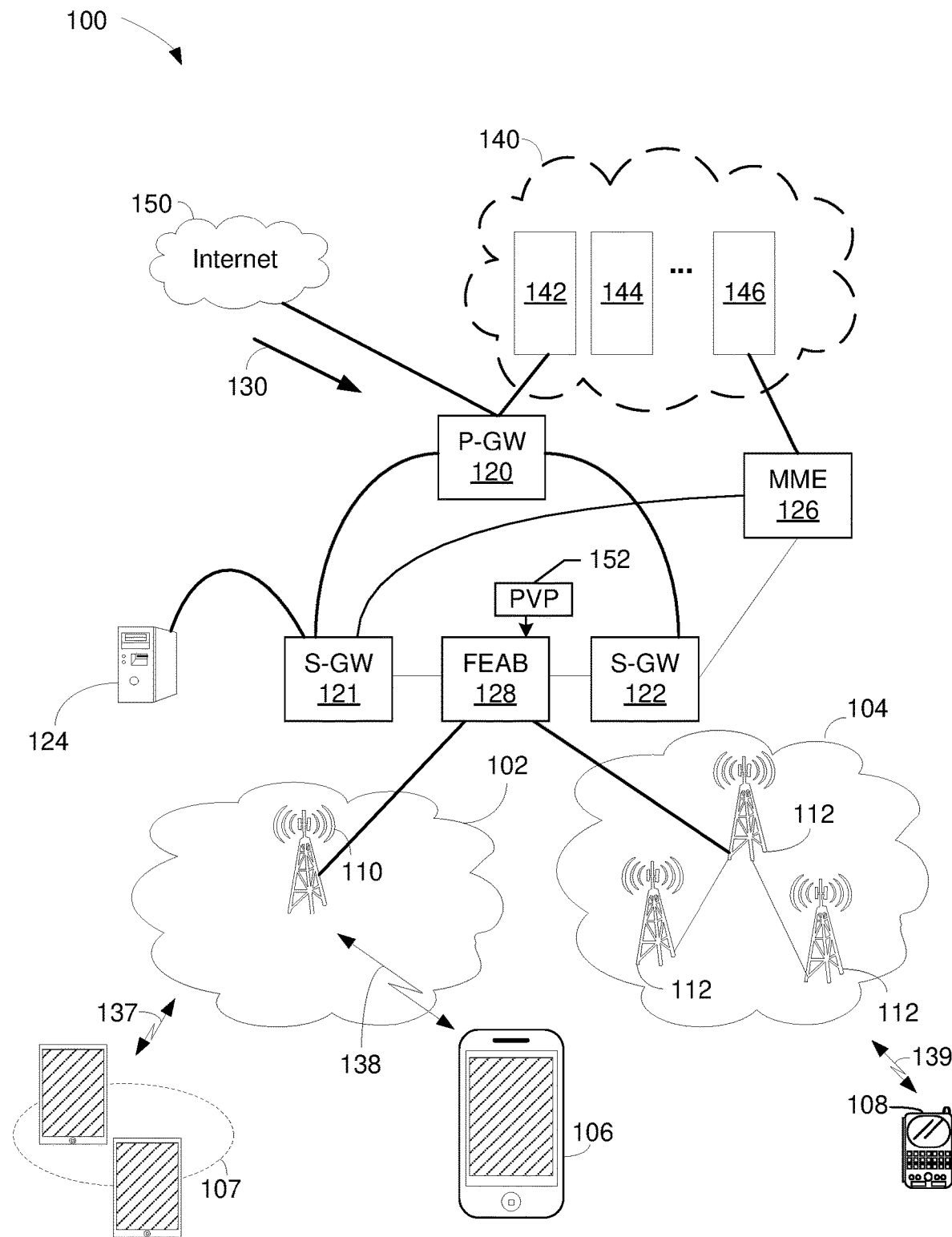
FIG. 1 is a block diagram illustrating a computing network configured to transmit data streams using a programmable vector processor in accordance with exemplary embodiments of the present invention.

Aspects of the present invention are described herein the context of a methods and/or apparatus for processing control information relating to wireless data.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, subsystems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 is a diagram illustrating a computing network 100 configured to transmit data streams using a programmable vector processor in accordance with exemplary embodiments of the present invention. The computer network 100 includes packet data network gateway ("P-GW") 120, two serving gateways ("S-GWs") 121-122, two base stations (or cell sites) 102-104, server 124, and Internet 150. P-GW 120 includes various components 140 such as billing module 142, subscribing module 144, tracking module 146, and the like to facilitate routing activities between sources and destinations. It should be noted that the underlying concepts of the exemplary embodiments of the present invention would not change if one or more blocks (or devices) were added or removed from computer network 100.

The configuration of the computer network 100 may be referred to as a third generation ("3G"), 4G, LTE, 5G, or combination of 3G and 4G cellular network configuration. MME 126, in one aspect, is coupled to base stations (or cell site) and S-GWs capable of facilitating data transfer between 3G and LTE (long term evolution) or between 2G and LTE. MME 126 performs various controlling/managing functions, network securities, and resource allocations.

S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment. S-GW 122 is also able to perform various network management functions, such as terminating paths, paging idle UEs, storing data, routing information, generating replica, and the like.

P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 3G and 4G (or LTE) packet core networks.

Sectors or blocks 102-104 are coupled to a base station or FEAB 128 which may also be known as a cell site, node B, or eNodeB. Sectors 102-104 include one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site can include additional radio towers as well as other land switching circuitry.

Server 124 is coupled to P-GW 120 and base stations 102-104 via S-GW 121 or 122. In one embodiment, server 124 which contains a soft decoding scheme 128 is able to distribute and/or manage soft decoding and/or hard decoding based on predefined user selections. In one exemplary instance, upon detecting a downstream push data 130 addressing to mobile device 106 which is located in a busy traffic area or noisy location, base station 102 can elect to decode the downstream using the soft decoding scheme distributed by server 124. One advantage of using the soft decoding scheme is that it provides more accurate data decoding, whereby overall data integrity may be enhanced.

When receiving bit-streams via one or more wireless or cellular channels, a decoder can optionally receive or decipher bit-streams with hard decision or soft decision. A hard decision is either 1 or 0 which means any analog value greater than 0.5 is a logic value one (1) and any analog value less than 0.5 is a logic value zero (0). Alternatively, a soft decision or soft information can provide a range of value from 0, 0.2, 0.4, 0.5, 0.6, 0.8, 0.9, and the like. For example, soft information of 0.8 would be deciphered as a highly likelihood one (1) whereas soft information of 0.4 would be interpreted as a weak zero (0) and maybe one (1).

A base station, in one aspect, includes one or more FEABs 128. For example, FEAB 128 can be a transceiver of a base station or eNodeB. In one aspect, mobile devices such tables or iPad® 107 uses a first type of RF signals to communicate with radio tower 110 at sector 102 and portable device 108 uses a second type of RF signals to communicate with radio tower 112 at sector 104. In an exemplary embodiment, the FEAB 128 comprises an exemplary embodiment of a PVP 152. After receiving RF samples, FEAB 128 is able to process samples using the PVP 152 in accordance with the exemplary embodiments. An advantage of using the PVP 152 is to improve throughput as well as resource conservation.

Figure 2:
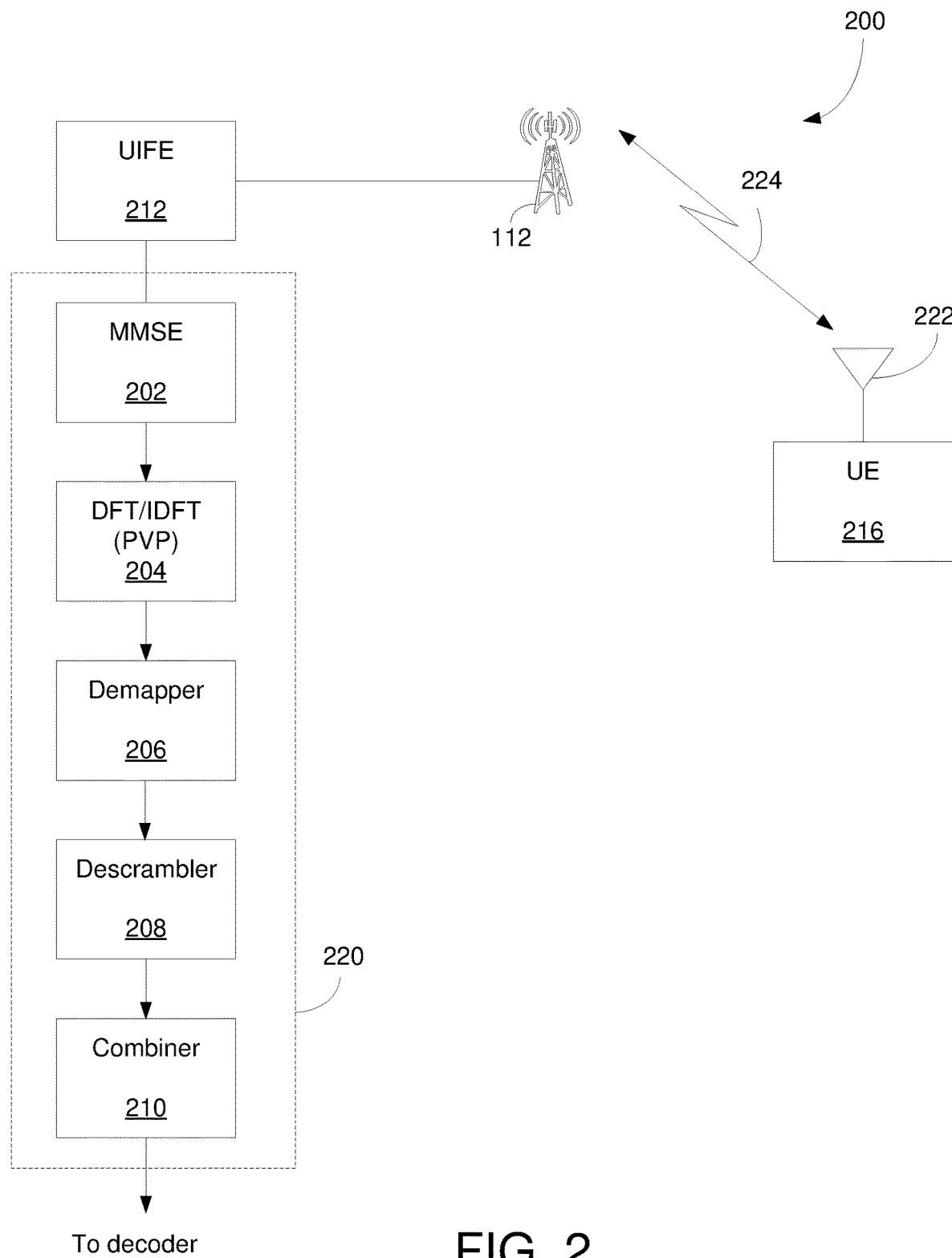
FIG. 2 is a block diagram illustrating logic flows of data streams traveling through a transceiver that includes a programmable vector processor in accordance with the exemplary embodiments of the present invention.

FIG. 2 is a block diagram 200 illustrating logic flows of data streams traveling through a transceiver that includes a programmable mixed-radix processor in accordance with the exemplary embodiments of the present invention. Diagram 200 includes user equipment ("UE") 216, uplink front end ("ULFE") 212, transceiver processing hardware ("TPH") 220, and base station 112. Base station 112 is capable of transmitting and receiving wireless signals 224 to and from TPH 220 via an antenna 222. It should be noted that the underlying concept of the exemplary embodiments of the present invention would not change if one or more devices (or base stations) were added or removed from diagram 200.

The TPH 220, in one example, includes MMSE 202, DFT/IDFT 204, and demapper 206, and is able to process and/or handle information between antenna 222 and a decoder. The information includes data and control signals wherein the control signals are used to facilitate information transmission over a wireless communication network. While MMSE may include an estimator able to provide an estimation based on prior parameters and values associated with bit streams, DFT/IDFT 204 converts symbols or samples between time and frequency domains. After conversion, DFT/IDFT 204 may store the symbols or samples in a storage matrix.

In one embodiment, DFT/IDFT 204 includes one or more programmable vector processors that determine DFT/IDFT values. Depending on the applications, DFT/IDFT 204 can transmit determined symbols to the next logic block such as demapper 208. In an exemplary embodiment, the storage matrix is a local storage memory which can reside in DFT/IDFT 204, demapper 206, or an independent storage location.

The MMSE 202, in one example, includes an equalizer with serial interference cancellation ("SIC") capability and provides possible processing paths between TPH and SIC path. MMSE 202, which can be incorporated in TPH 220, generates estimated value using a function of mean-square-error or equalization of received signals or bit stream(s) during the signal processing phase. MMSE 202 also provides functionalities to equalize multiple streams of data received simultaneously over the air. For instance, the number of bit streams such as one (1) to eight (8) streams can arrive at antenna 222 simultaneously. MMSE 202 also supports frequency hopping and multi-cluster resource block ("RB") allocations. Note that the frequency offset may be used to compensate channel estimates before performing time interpolation. Time interpolation across multiple symbols may be performed in multiple modes.

The Demapper 206, in one aspect, includes a first minimum function component ("MFC"), a second MFC, a special treatment component ("STC"), a subtractor, and/or an LLR generator. A function of demapper 206 is to demap or ascertain soft bit information associated to received symbol(s) or bit stream(s). For example, demapper 206 employs soft demapping principle which is based on computing the log-likelihood ratio (LLR) of a bit that quantifies the level of certainty as to whether it is a logical zero or one. To reduce noise and interference, demapper 206 is also capable of discarding one or more unused constellation points relating to the frequency of the bit stream from the constellation map.

In an exemplary embodiment, the DFT/IDFT 204 converts signals between the frequency domain and the time domain using a discrete Fourier transform ("DFT") and an inverse DFT ("IDFT"). The DFT and IDFT can be defined as;

$$DFT: X[k] = \sum_{n=0}^{N-1} x[n] W_N^{kn}$$

and $$IDFT: x[n] = \frac{1}{\sqrt{N}} \sum_{k=0}^{N-1} X[k] W_N^{-kn}$$

where $$W_N = e^{-2\pi j/N}.$$

In the above expressions, the output is properly scaled after all radix states so that the average power of DFT/IDFT output is the same as the input.

FIG. 3 is a table 300 showing DFT/IDFT sizes with respect to index and resource block ("RB") allocations in accordance with exemplary embodiments of the present invention. In one embodiment, LTE networks are generally required to support many different configurations using different DFT sizes with mixed radix computations. For example, an N-point DFT can be determine from the following radix factorization.

$$N=2^\alpha 3^\beta 5^\gamma$$

Thus, for a DFT of size N, a factorization can be determined that identifies the radix2, radix3 and radix5 computations to be performed to compute the DFT result. In various exemplary embodiments, the PVP operates to use a vector pipeline and associated vector feedback path to perform an iterative process to compute various radix factorizations when determining DFT/IDFT values.

Figure 4:
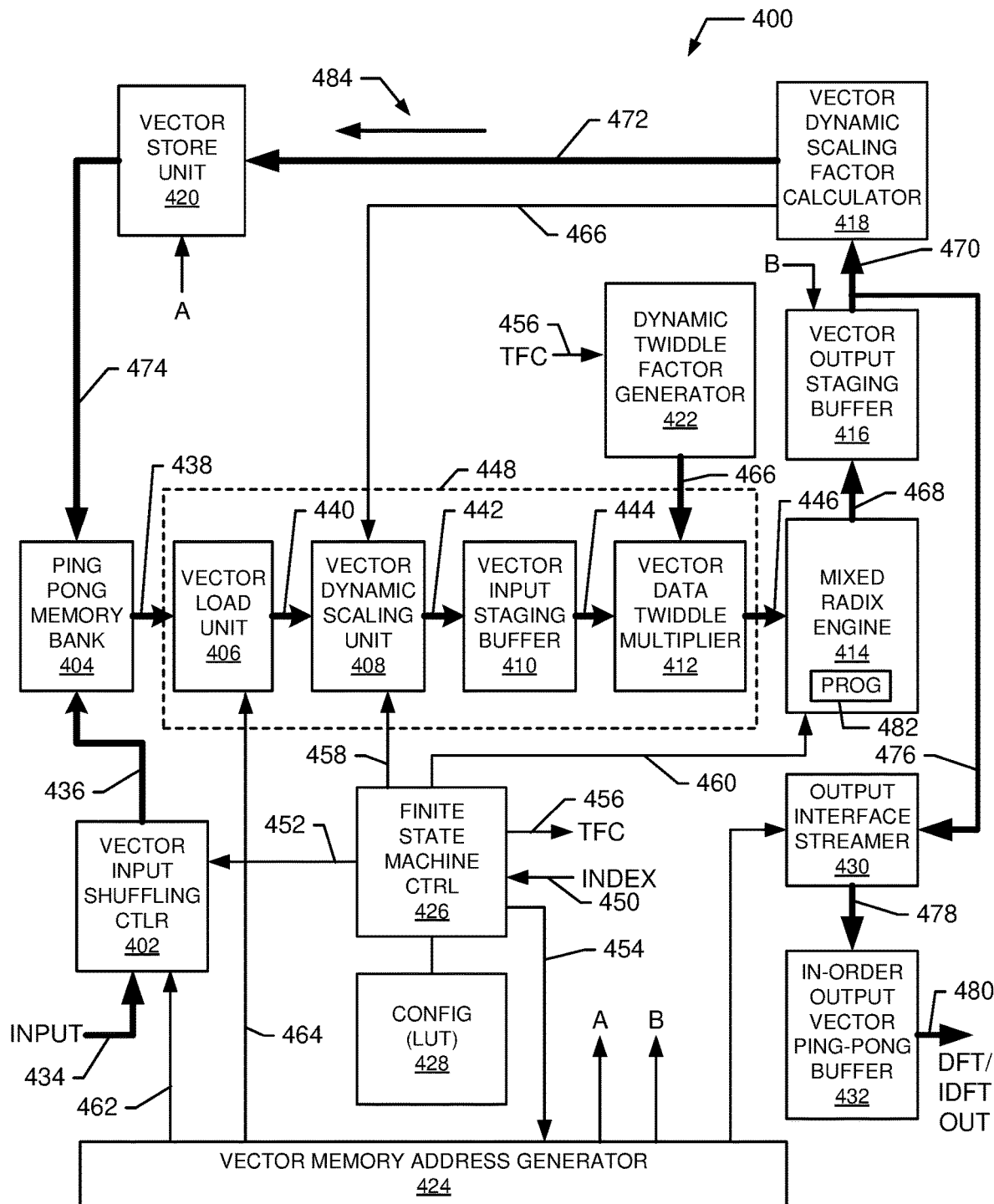
FIG. 4 is a block diagram illustrating an exemplary embodiment of a programmable vector processor in accordance with exemplary embodiments of the present invention.

FIG. 4 is a block diagram illustrating an exemplary embodiment of a PVP 400 in accordance with the present invention. In one embodiment, the PVP 400 comprise one single programmable vector mixed-radix engine 414 that is a common logic block reused for all the different radix sizes calculations. Thus, the vector engine 414 is reused iteratively as the ALU (Arithmetic Logic Unit) of the PVP 400. Complex control logic and memory sub-systems are used as described herein to load/store data in a multiple-stage radix computation by iteratively feeding data to the single vector mixed-radix engine 414. In another exemplary embodiment, multiple vector engines 414 are utilized.

Exemplary embodiments of the PVP 400 satisfy the desire for low power consumption and reduced hardware resources by iteratively reusing a single pipelined common vector data-path for all possible combinations of mixed-radix computations, yet still achieving streaming in/output data throughput of multiple samples/cycle with much less logic utilization. Besides its much higher performance to power/area ratio over conventional architectures, exemplary embodiments of the PVP 400 achieve much higher scalability and programmability for all possible mix-radix operations.

In an exemplary embodiment, the PVP 400 also comprises vector input shuffling controller 402, ping-pong memory bank 404, vector load unit 406, vector dynamic scaling unit 408, vector input staging buffer 410, vector data twiddle multiplier 412, vector output staging buffer 416, vector dynamic scaling factor calculator 418, vector store unit 420, dynamic twiddle factor generator 422, vector memory address generator 424, finite state machine controller 426, configuration list 428 output interface streamer 430 and in-order output vector ping-pong buffer 432. In an exemplary embodiment, the vector load unit 406, vector dynamic scaling unit 408, vector input staging buffer 410, and vector data twiddle multiplier 412 form a vector datapath pipeline 448 that carries vector data from the memory 404 to the vector mixed-radix engine 414. The vector output staging buffer 416, vector dynamic scaling factor calculator 418, and vector store unit 420 for a vector feedback datapath 484 that carries vector data from the vector mixed-radix engine 414 to the memory 404.

In an exemplary embodiment, the finite state machine controller 426 receives an index value 450 from another entity in the system, such as a central processor of the DFT/IDFT 204. Using the index value, the state machine 426 accesses the configuration information 428 to determine the size (N) of the DFT/IDFT to be performed. For example, the configuration information 428 includes the table 300 that cross-references index values with size (N) values. Once the DFT/IDFT size is determined, the state machine 426 accesses the configuration information 428 to determine a factorization that identifies the number and type of radix computations that need to be performed to complete the DFT/IDFT operation.

Once the radix factorization is determined, the state machine 426 provides input shuffling control signals 452 to the vector input shuffling controller 402 that indicate how input data 434 is to be written into the memory 404 to allow efficient readout into the vector pipeline 448. The state machine 426 also provides address control signals 454 to the vector memory address generator 424 that indicate how memory addresses are to be generated to read-out, store, move and otherwise process data throughout the PVP 400. The state machine 426 also generated twiddle factor control (TFC) signals 456 that are input to twiddle factor generator 422 to indicate how twiddle factor are to be generated for use by the twiddle multiplier 412. The state machine 426 also generates scaling control signals 458 that are input to the scaling unit 408 to indicate how pipeline vector data is to be scaled. The state machine 426 also generates radix engine control signals 460 that indicate how the mixed radix engine is to perform the DFT/IDFT calculations based on the radix factorization.

In an exemplary embodiment, the vector input shuffling controller 402 receives streaming input data 434 at the draining throughput of the previous module in the system with a rate of up to 12 samples/cycle. However, this is exemplary and other rates are possible. The shuffling controller 402 uses a vector store operation to write the input data 434 into the ping-pong vector memory bank 404. For example, the shuffling controller 402 receives the control signals 452 from the state machine 426 and address information 462 from the address generator 424 and uses this information to shuffling and/or organize the input data 434 so that it can be written into the memory bank 404. For example, parallel data path 436 carries parallel input data to be written to the ping-pong memory bank 404. After the shuffling operation, all the data are stored in a matrix pattern in the ping-pong vector memory bank 404 to allow efficient data read-out to facilitate the selected multi-stage radix-operation with in-order write-back. In an exemplary embodiment, the ping-pong memory bank 404 includes "ping" and "pong" memory banks that may be selectively written to or read from to facilitate efficient data flow.

In an exemplary embodiment, the vector load unit 406 reads the data in parallel for the multiple radix-operations from either the ping or pong memory banks 404 to feed the down-stream operations. For example, the vector load unit 406 receives address information 464 from the address generator 424 which indicates how data is to be read from the memory bank 404. For example, parallel data path 438 carries parallel data read from the ping-pong memory banks 404 to the vector load unit 406. The vector load unit 406 can generate full throughput (e.g., 12 samples/cycle) at the output of vector load unit 406 with no interruption. For example, parallel data path 440 carries parallel data output from the vector load unit 406 to the scaling unit 408.

In an exemplary embodiment, the vector dynamic scaling unit 408 scales all the parallel samples within one cycle to keep the signal amplitude within the bit-width of the main data-path after each stage of radix computation. A scaling factor 466 is calculated by the vector dynamic scaling factor calculator 418 without stalling the pipeline for each iteration. The scaling factor 466 and the scaling control signals 458 are used by the vector dynamic scaling unit 408 to perform the scaling operation. For example, parallel data path 442 carries scaled parallel data output from the vector dynamic scaling unit 408 after the scaling operation is performed.

In an exemplary embodiment, the vector input staging buffer 410 comprises an array of vector registers that are organized in a matrix pattern. The scaled vector-loaded data originating from the main ping-pong memory bank 404 and carried on data path 442 is written column-wise into the array of vector staging registers. The registers are then read out row-wise to form the parallel data input to the vector data twiddle multiplier 412. For example, the data path 444 carries parallel data output from the vector input staging buffer 410 to the vector data twiddle multiplier 412.

In an exemplary embodiment, vector data twiddle multiplier 412 multiplies the scaled and staged samples with twiddle factors received by the dynamic twiddle factor generator 422 over signal path 466. The dynamic twiddle factor generator 422 receives the TFC 456 and generates twiddle factors to be multiplied with the scaled data. The vector data twiddle multiplier 412 generates 12 samples/cycle of input for radixes (2, 3, 4, 6) scenarios or 10-samples for the radix-5 scenario to feed into the programmable vector mix-radix engine 414 using signal path 446.

The mixed-radix engine 414 uses a pipelined data-path to implement multiple vector radix operations for all the different radix-factorization schemes. It is controlled by a radix-mode program controller 482 within the engine for each iteration stage. The engine data-path reuses the same logic for all the different combinations of radix operations. As an example, it can reuse the common functional logic to compute multiple radix3, radix4, radix5 and radix6 computations with no pipeline stall. For example, in an exemplary embodiment, the engine 414 can be reconfigured to compute four (4) radix3, three (3) radix4, two (2) radix5, or two (2) radix6 computations with no pipeline stall. A more detailed description of the mixed radix engine 414 is provided below.

The vector memory address generator 424 operates to provide memory address and control information to the vector input shuffling controller 402, vector load unit 406, vector store unit 420 (see A), vector output staging buffer 416 (see B), and the output interface streamer 430. The addresses coordinate the flow of data into the memory bank 404 and through the pipeline 448 to the mixed radix engine 414. Processed data is output from the engine 414 and input to the vector output staging buffer 416 on the vector feedback data path 484 that leads back to the ping-pong memory 404. For example, after the data passes through the vector dynamic scaling factor calculator 418, it flows to the vector store unit 420, which uses the address information (A) it receives to store the data back into the ping-pong memory 404.

In an exemplary embodiment, the PVP 400 determines a DFT/IDFT conversion by performing multiple iterations where in each iteration, a particular radix calculation is performed. Thus, in an exemplary embodiment, after performing intermediate radix computations, the intermediate results are stored back into the memory 404. For example, the intermediate radix results are output to the vector output staging buffer 416 using the vector data path 468. The vector output staging buffer 416 uses address and control information (B) received from the address generator 424 to receive the intermediate radix results and output the results in an appropriate order the vector dynamic scaling factor calculator 418 using vector data path 470.

The vector dynamic scaling factor calculator 418 calculates scaling factors from the received radix results and outputs the scaling factors 466 to the dynamic scaling factor unit 408. The radix results are then forward to the vector store unit 420 using vector data path 472. The vector store unit 420 receive address and control information (A) from the address generator 424 and stored the received vector data in the ping-pong memory bank 404 according to the received control and address information. In an exemplary embodiment, the intermediate vector radix results are stored in-place corresponding to the data that was used to generate the radix results. In an exemplary embodiment, the staging buffer 416, scaling factor calculator 418 and vector store unit 420 form a vector feedback data path 484 to allow results from the mixed radix engine 414 to be stored into the memory 404.

In an exemplary embodiment, a final iteration is performed where the mixed radix engine 414 computes a resulting DFT/IDFT. The results are output from the vector output staging buffer 416 to the output interface streamer 430 using vector data path 476. The output interface streamer 430 receive processed data from the output staging buffer 416 and outputs this data to the in-order output vector ping-pong buffer 432 using the vector data path 478. The in-order output vector ping-pong buffer 432 outputs the DFT/IDFT data 480 to downstream entities in the correct order.

Computational Iterations

In an exemplary embodiment, the PVP 400 operates to compute a desired DFT/IDFT using multiple iterations where in each iteration a particular radix calculation is performed. For example, the PVP 400 initially computes a radix factorization to determine the radix computations to be made to compute the DFT/IDFT for the given point size N. Data is stored in the memory 404 and read out into the vector pipeline 448 where it is scaled, staged, and multiplied by twiddle factors. The results are input to the mixed radix engine 414 that is configured to perform a first radix computation. The intermediate radix result is written back to the memory bank 404 using the vector feedback path 484. A next iteration is performed to compute the next radix factor. The radix engine 414 is reconfigured to compute this next radix factor. The iterations continue until the complete DFT/IDFT is computed. The radix engine 414 then outputs the final result through the output staging buffer 416 over path 476 to the output interface streamer 430. Thus, to determine an N-point DFT/IDFT, a radix factorization is determined that is used to perform a selected number of iterations to calculate each radix factor. For each iteration the radix engine 414 is reconfigured to compute the desired radix computation. As a result, the PVP 400 uses a pipeline architecture to compute DFT/IDFT values with high speed and efficiency, while the reconfigurable radix engine 414 utilizes fewer resources.

Figure 5:
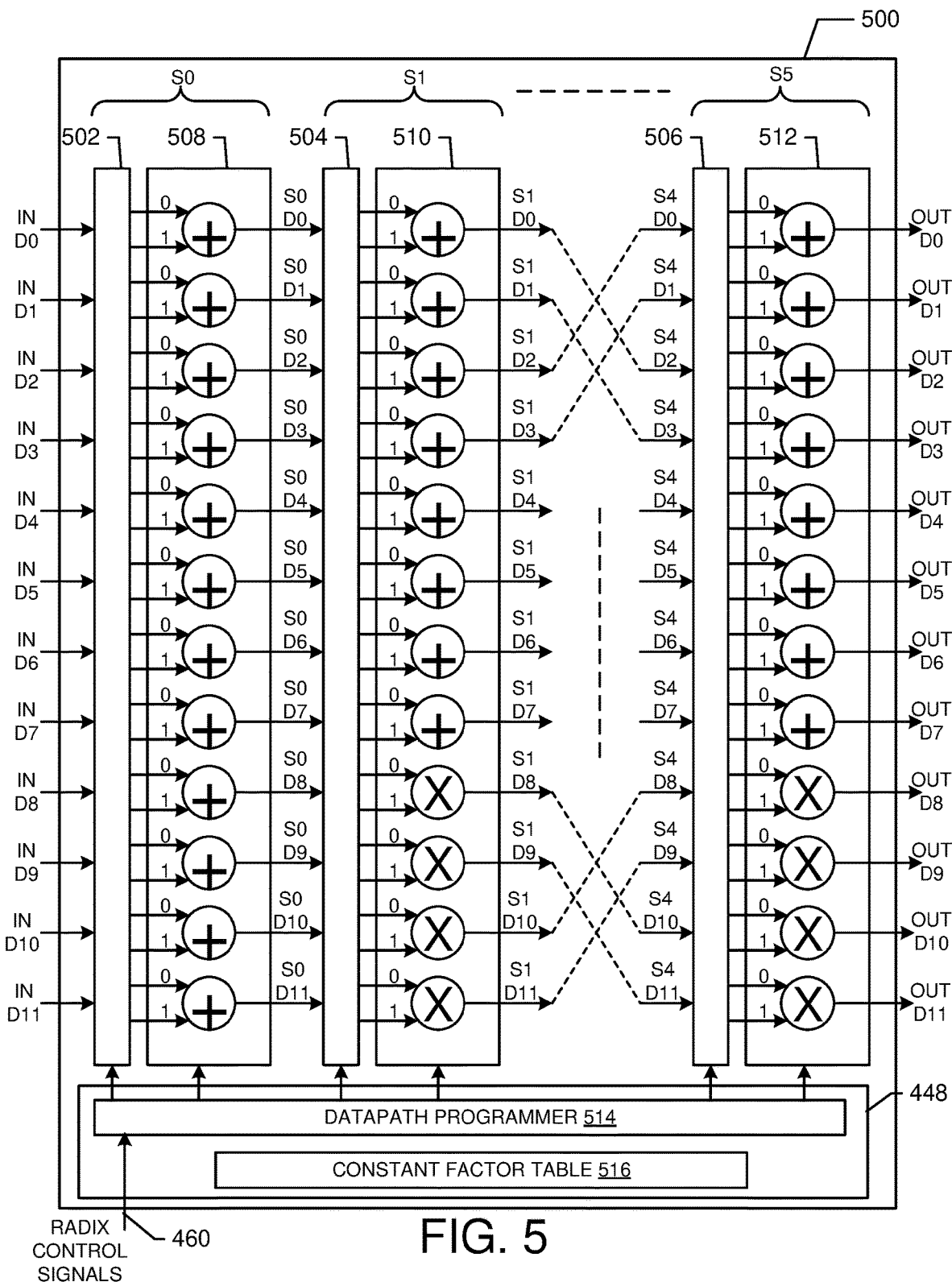
FIG. 5 is a block diagram illustrating a detailed exemplary embodiment of a programmable vector mixed-radix processor in accordance with exemplary embodiments of the present invention.

FIG. 5 is a block diagram illustrating a detailed exemplary embodiment of a programmable vector mixed-radix processor 500 in accordance with exemplary embodiments of the present invention. For example, the processor 500 is suitable for use as the programmable vector mixed-radix engine 414 shown in FIG. 4. The processor 500 includes multiple stages (S0-S5) that include complex ALU (Arithmetic Logic Unit) Arrays (e.g., shown at 508, 510, and 512) and connecting multiplexers (e.g., shown at 502, 504 and 506). The multiplexers and the ALUs of the stages (S0-S5) are configurable to allow the processor 500 to perform R2, R3, R4, R5, and R6 radix computations.

In an exemplary embodiment, the radix-mode program controller 482 comprises the data-path programmer 514 and the LUT 516. The data-path programmer 514 comprises at least one of logic, a processor, CPU, state machine, memory, discrete hardware and/or other circuitry that operates to allow the programmer 514 to reconfigure the ALU arrays and multiplexers based on the received radix engine control signals 460. A small LUT (Look Up-Table) 516 holds a set of constant scaling values for the radix equations.

In an exemplary embodiment, vector input data (IN D0-D11) is received at the mux 502. The vector input data is received from the twiddle multiplier 412 such that the generated twiddle factors have already been applied to the data. The mux 502 is configured by the programmer 514 based on the received radix engine control signals 460 to connect the input data to the ALU 508 in a particular connection pattern. The ALU 508 is configured by the programmer 514 to perform arithmetic operations (such as add the data and/or constants together) based on the received radix engine control signals 460. The results of the arithmetic operations of the ALU 508 (S0 D0-D11) are input to the mux 504 of stage S1.

In an exemplary embodiment, the stage S1 operates similarly to the stage S0. The mux 504 receives the data (S0 D0-D11) output from the stage S0 and connects this input data to the ALU 510 in a particular connection pattern. The mux 504 is configured by the programmer 514 based on the received radix engine control signals 460. The ALU 510 is configured by the programmer 514 to perform arithmetic operations (such as add and/or multiply the data and/or constants together) based on the received radix engine control signals 460. The results of the arithmetic operations of the ALU 510 (S1 D0-D11) are input to the mux of stage S2 (not shown).

In an exemplary embodiment, the stages S2-S4 operates similarly to the stage S1. The stage S4 outputs data (S4 D0-D11) that has been processed by these stages configured by the programmer 514 according to the received radix control signals 460. The mux 506 of the stage S5 receives the data processed by the stage S4 and connects this input data to the ALU 512 in a particular connection pattern. The mux 506 is configured by the programmer 514 based on the received radix engine control signals 460. The ALU 512 is configured by the programmer 514 to perform arithmetic operations (such as add and/or multiply the data and/or constants together) based on the received radix engine control signals 460. The results of the arithmetic operations of the ALU 512 (OUT D0-D11) are output from the processor 500. Thus, the processor 500 is re-configurable to perform a variety of radix computations on data received from the twiddle multiplier 412 of the pipeline 448. The radix computations include radix3, radix4, radix5 and radix6 DFT computations.

Figure 6:
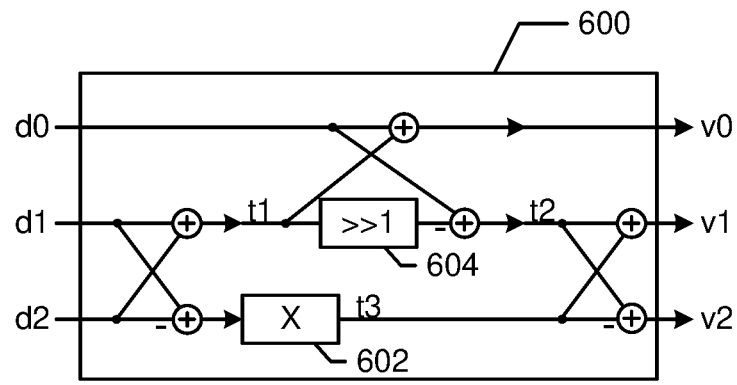
FIG. 6 is a block diagram of a radix3 configuration for use with the programmable vector mixed-radix processor in accordance with exemplary embodiments of the present invention.

FIG. 6 is a block diagram of a radix3 configuration 600 for use with the programmable vector mixed-radix processor 500 in accordance with exemplary embodiments of the present invention. For example, the stages (S0-S5) of the processor 500 can be configured to perform a radix3 computation using the configuration 600. In an exemplary embodiment, three data bits (d0-d2) are input to the configuration 600. The input data is added and a multiplication block 602 and a shift block 604 are utilized to generate three output bits (v0-v2) that represent the radix3 computation.

Figure 7:
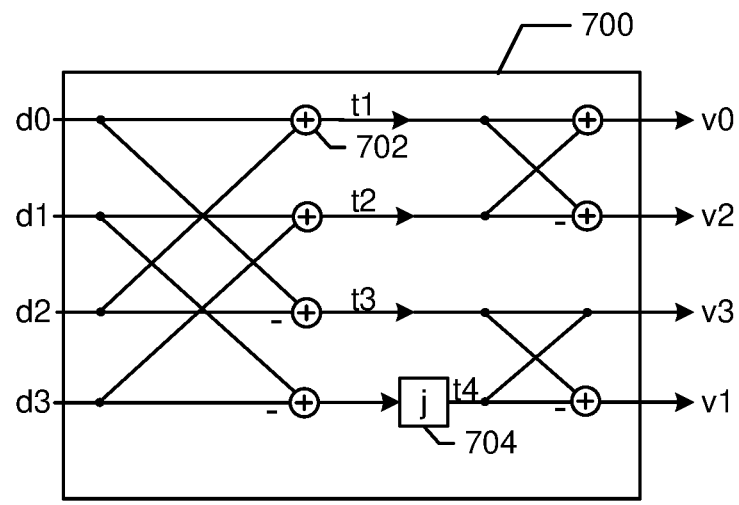
FIG. 7 is a block diagram of a radix4 configuration for use with the programmable vector mixed-radix processor in accordance with exemplary embodiments of the present invention.

FIG. 7 is a block diagram of a radix4 configuration 700 for use with the programmable vector mixed-radix processor 500 in accordance with exemplary embodiments of the present invention. For example, the stages (S0-S5) of the processor 500 can be configured to perform a radix4 computation using the configuration 700. In an exemplary embodiment, four data bits (d0-d3) are input to the configuration 700. The input data is added and a multiplication block 704 is utilized to generate four output bits (v0-v3) that represent the radix4 computation.

Figure 8:
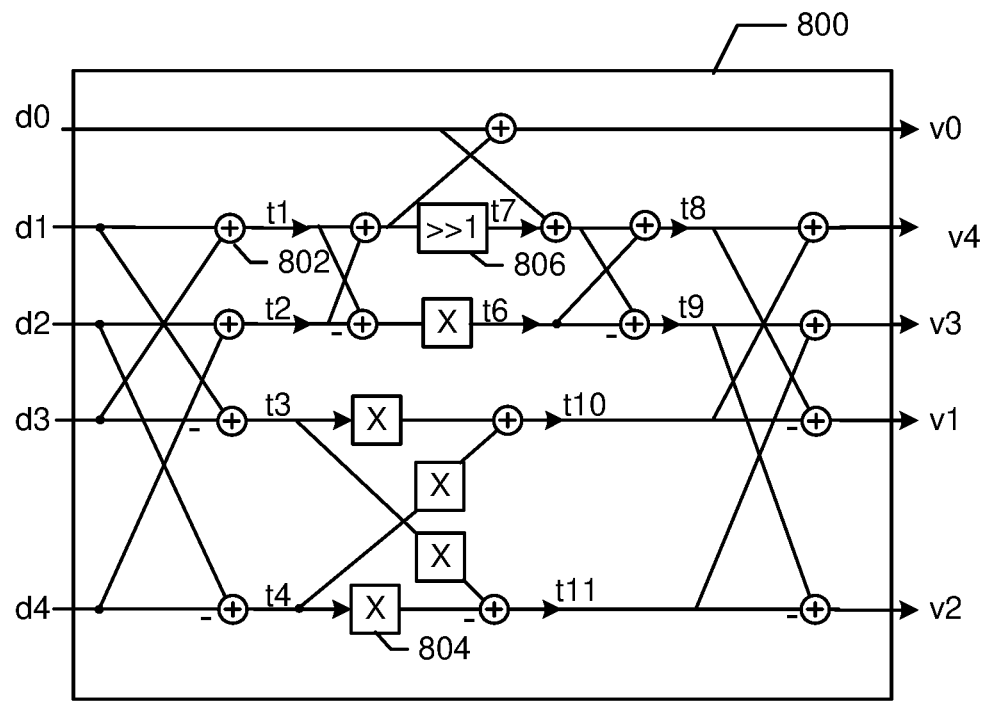
FIG. 8 is a block diagram of a radix5 configuration for use with the programmable vector mixed-radix processor in accordance with exemplary embodiments of the present invention.

FIG. 8 is a block diagram of a radix5 configuration 800 for use with the programmable vector mixed-radix processor 500 in accordance with exemplary embodiments of the present invention. For example, the stages (S0-S5) of the processor 500 can be configured to perform a radix5 computation using the configuration 800. Five data bits (d0-d4) are input to the configuration 800. Addition blocks (e.g., 802), multiplication blocks (e.g., 804), and shift block 806 are utilized to generate five output bits (v0-v4).

Figure 9:
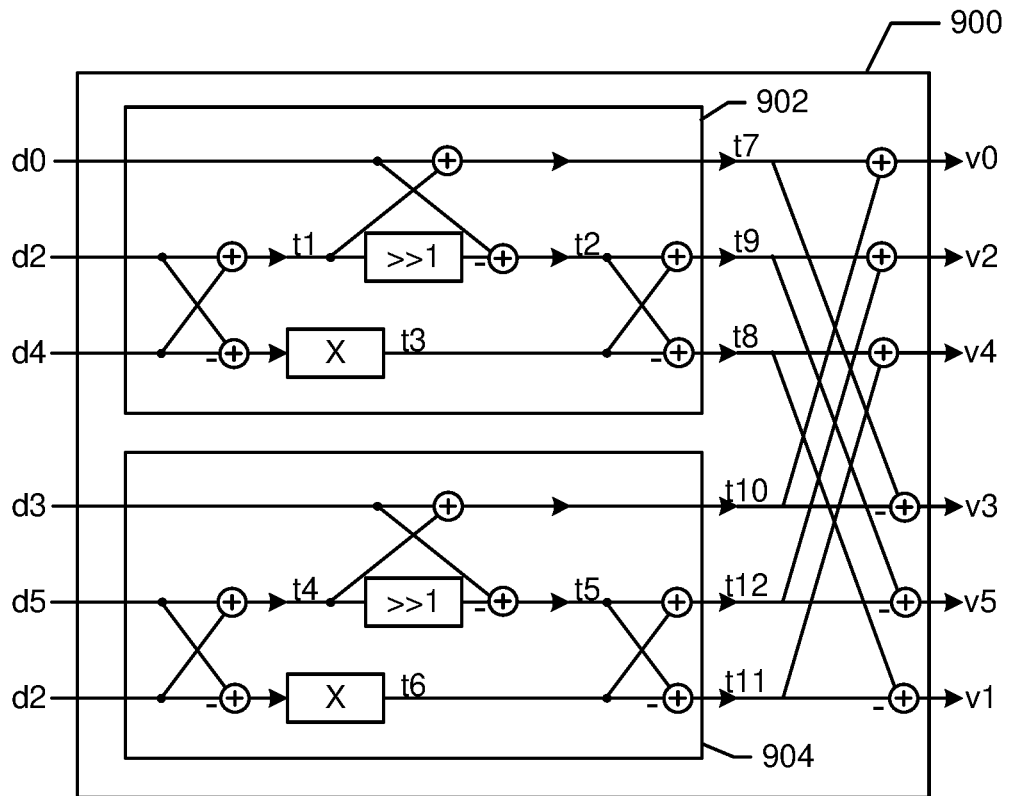
FIG. 9 is a block diagram of a radix6 configuration for use with the programmable vector mixed-radix processor in accordance with exemplary embodiments of the present invention.

FIG. 9 is a block diagram of a radix6 configuration 900 for use with the programmable vector mixed-radix processor 500 in accordance with exemplary embodiments of the present invention. For example, the stages (S0-S5) of the processor 500 can be configured to perform a radix6 computation using the configuration 900. Six data bits (d0-d5) are input to the configuration 900. The data bits are input to two blocks 902 and 904 that are configured for radix3 operation as shown in block 600. The outputs of the block 902 and 904 are combined to generate six output bits (v0-v5).

Figure 10:
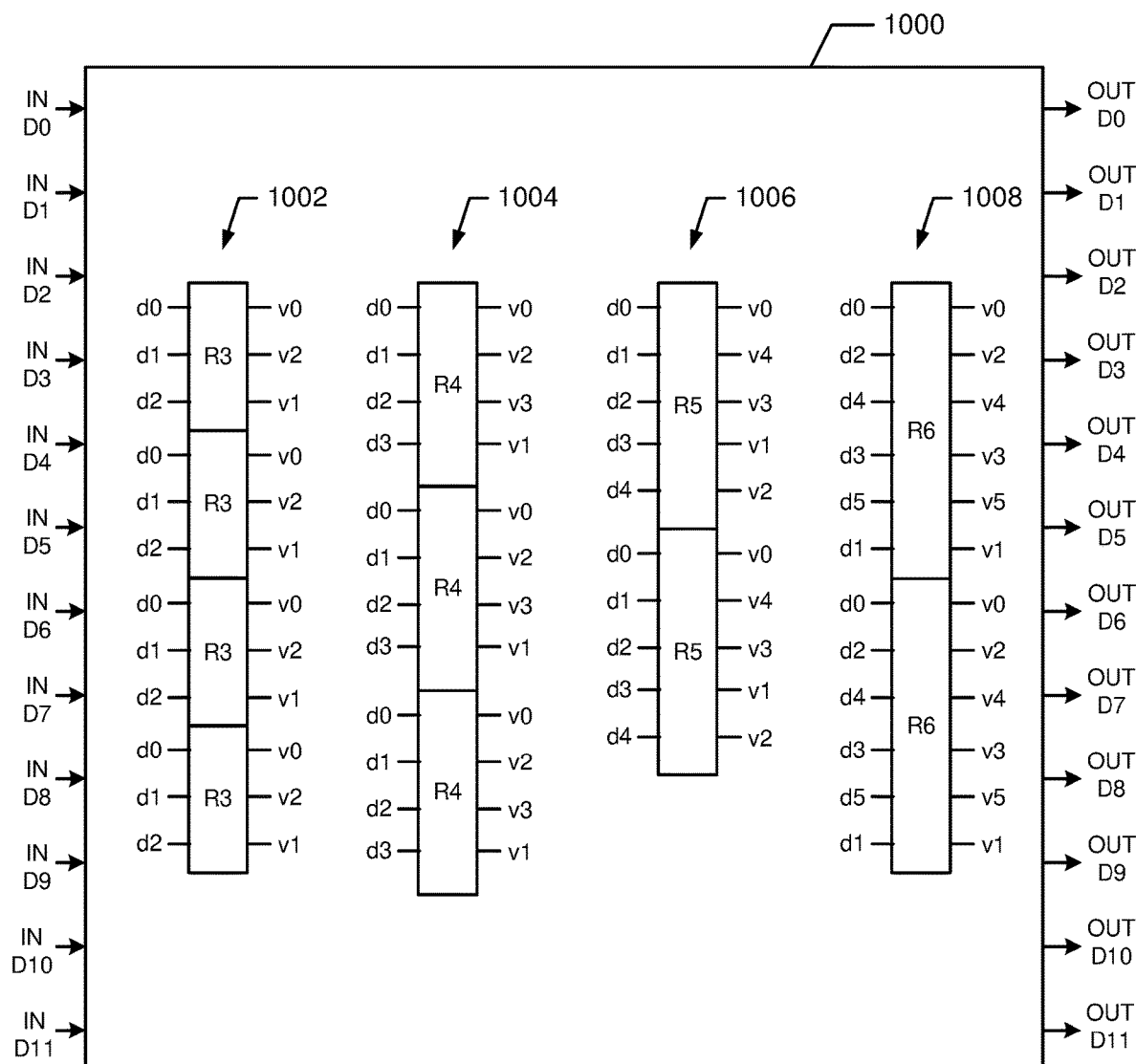
FIG. 10 is a block diagram illustrating a configurable vector mixed-radix engine in accordance with one embodiment of the present invention.

FIG. 10 is a block diagram illustrating a configurable vector mixed-radix engine 1000 in accordance with one embodiment of the present invention. For example, the engine 1000 is suitable for use as the engine 500 shown in FIG. 5. The engine 1000 comprises a radix-operator datapath that is configured to compute selected radix modes. In an exemplary embodiment, the radix-mode can be four parallel radix3 computations (4vR3 as shown in block 1002), or three parallel radix4 computations (3vR4 as shown in block 1004), or two parallel radix5 computations (2 vR5 in block 1006), or two parallel radix6 computations (2vR6 in block 1008). After each configuration is selected, data can be pipelined into each run-time data-path with no stall within the iteration stage. The input and output of 12-samples are selected according to the radix-mode and stage index based on the DFT/IDFT algorithm.

Figure 11:
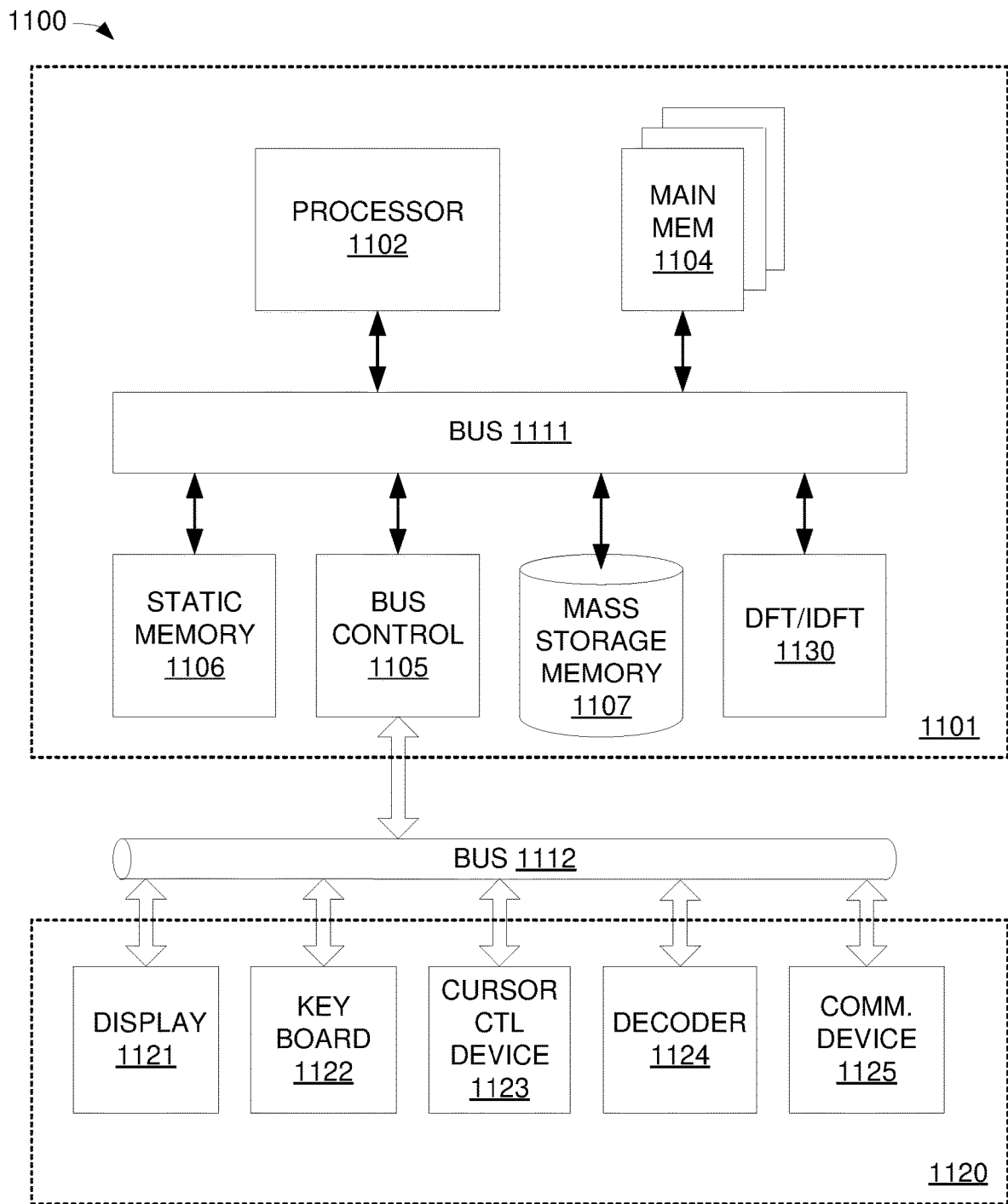
FIG. 11 illustrates an exemplary digital computing system that comprises a programmable vector processor having a configurable vector mixed-radix engine with iterative pipeline in accordance with embodiments of the invention.

FIG. 11 illustrates an exemplary digital computing system 1100 that comprises a programmable vector processor having a configurable vector mixed-radix engine with iterative pipeline in accordance with embodiments of the invention. It will be apparent to those of ordinary skill in the art that the programmable mixed-radix processor with iterative pipelined vector engine is suitable for use with other alternative computer system architectures.

Computer system 1100 includes a processing unit 1101, an interface bus 1112, and an input/output ("IO") unit 1120. Processing unit 1101 includes a processor 1102, main memory 1104, system bus 1111, static memory device 1106, bus control unit 1105, and mass storage memory 1107. Bus 1111 is used to transmit information between various components and processor 1102 for data processing. Processor 1102 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Mass storage memory 1107 may be a magnetic disk, solid-state drive ("SSD"), optical disk, hard disk drive, floppy disk, CD-ROM, and/or flash memories for storing large amounts of data.

I/O unit 1120, in one example, includes a display 1121, keyboard 1122, cursor control device 1123, decoder 1124, and communication device 1125. Display device 1121 may be a liquid crystal device, flat panel monitor, cathode ray tube ("CRT"), touch-screen display, or other suitable display device. Display device 1121 projects or displays graphical images or windows. Keyboard 1122 can be a conventional alphanumeric input device for communicating information between computer system 1100 and computer operator(s). Another type of user input device is cursor control device 1123, such as a mouse, touch mouse, trackball, or other type of cursor for communicating information between system 1100 and user(s).

Communication device 1125 is coupled to bus 1111 for accessing information from remote computers or servers through wide-area network. Communication device 1125 may include a modem, a router, or a network interface device, or other similar devices that facilitate communication between computer 1100 and the network. In one aspect, communication device 1125 is configured to perform wireless functions.

In one embodiment, DFT/IDFT component 1130 is coupled to bus 1111 and is configured to provide a high speed programmable vector processor having a configurable vector mixed-radix engine with iterative pipeline in accordance with embodiments of the invention. For example, DFT/IDFT 1130 can be configured to include the PVP 400 shown in FIG. 4. The DFT/IDFT component 1130 can be hardware, hardware executing software, firmware, or a combination of hardware and firmware. For example, the component 1130 operates to receive streaming data and compute a desired N-point DFT that is output from the component 1130. Accordingly, the component 1130 may also operate to compute a desired IDFT.

Figure 12:
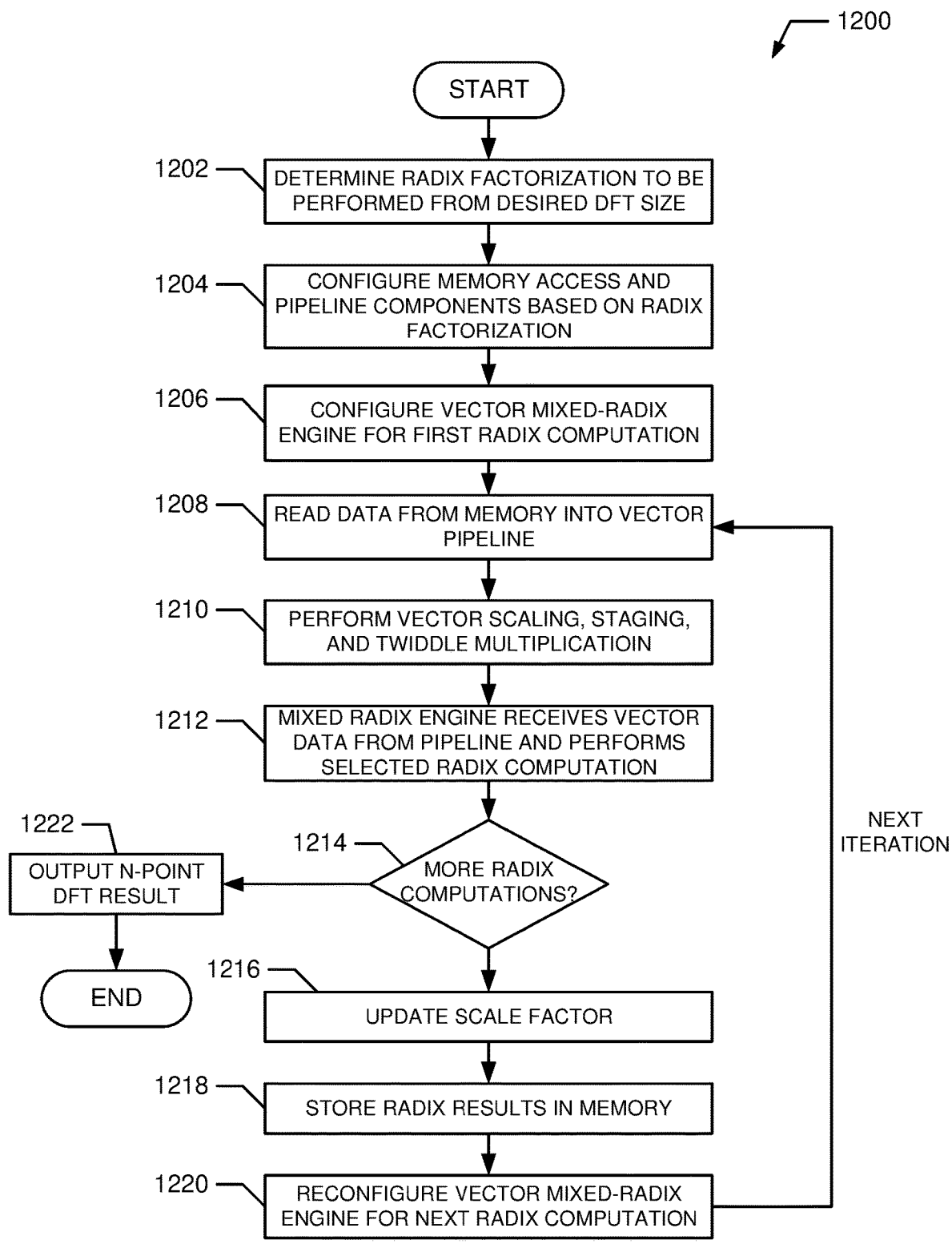
FIG. 12 illustrates an exemplary method for operating a programmable vector processor having a configurable vector mixed-radix engine with iterative pipeline in accordance with embodiments of the invention.

FIG. 12 illustrates an exemplary method 1200 for operating a programmable vector processor having a configurable vector mixed-radix engine with iterative pipeline in accordance with embodiments of the invention. For example, the method 1200 is suitable for use with the PVP 400 shown in FIG. 4.

At block 1202, a radix factorization is determined. For example, a radix factorization is determined to compute an N-point DFT associated with a particular index value. For example, the index value 450 for the N-point DFT to be computed is received at the state machine controller 426, which accesses the configuration information 428 to determine a radix factorization which can be used to compute the DFT.

At block 1204, memory accesses and pipeline components are configured based on the radix factorization. For example, based on the determined radix factorization, the state machine controller 426 determines how many iterations and radix computations it will take to compute the desired DFT. The state machine 426 outputs control signals 452 to the shuffling controller 402 to control how input data is stored in the memory 404. The state machine 426 outputs control signals 454 to control how memory addresses and control signals are generated by the address generator 424. These addresses and control signals are used control how data is transmitted through the vector pipeline 448 and the vector feedback path 484 for each iteration of the DFT computation.

At block 1206, the configurable vector mixed-radix engine is configured to perform a first radix computation. For example, the state machine 426 outputs radix control signals 460 to the program controller and the programmer 514 uses these signals to configure the stages (S0-S5) (e.g., vector engines) of the mixed-radix engine 500 to perform the selected radix computation, such as a radix3, radix4, radix5, or radix 6 computation. For example, the stages are configured to one of the configurations shown in FIG. 10 to perform the selected radix computation.

At block 1208, vector data is read from the memory into the vector pipeline. For example, input data stored in the memory 404 is read out and input to the pipeline 448. In an exemplary embodiment, the vector data is input to the pipeline 448 at a rate of 12 samples per cycle.

At block 1210, vector scaling, staging, and twiddle factor multiplication of the vector data is performed. For example, the vector data is scaled by the scaling unit 408, staged by the staging buffer 410, and multiplied by twiddle factors at the twiddle multiplier 412.

At block 1212, the selected radix computation is performed. For example, the mixed-radix engine 500 performs the selected radix computation, such as a radix3, radix4, radix5, or radix 6 computation) as configured by the programmer 514.

At block 1214, a determination is made as to whether additional radix computations are required to complete the computation of the desired DFT. If additional radix computations are required, the result is output on the vector feedback path 484 to the staging buffer 416 and the method proceeds to block 1216. If no additional computations are required and the computation of the DFT is complete, the method proceeds to block 1222.

At block 1216, a scaling factor is updated. For example, the results of the radix computation flow to the scaling factor calculator 418, which calculates a new scaling factor and outputs this scaling factor 466 to the scaling unit 408.

At block 1218, the result of the radix computation is stored in memory. For example, the results of the radix computation a stored in the memory 404 by the vector store unit 420. In an exemplary embodiment, the radix result is stored (in-place) at the same memory locations as the initial data used to compute the result.

At block 1220, the mixed-radix engine 500 is reconfigured to perform the next radix calculation. For example, the state machine 426 outputs radix control signals 460 to the program controller and the programmer 514 uses these signals to configure the stages (S0-S5) (e.g., vector engines) of the mixed-radix engine 500 to perform the next radix computation, such as a radix3, radix4, radix5, or radix 6 computation. For example, the stages are configured to one of the configurations shown in FIG. 10 to perform the selected radix computation. The method then proceeds to block 1208 to perform the next iteration.

At block 1222, the N-point DFT is output. For example, the mixed radix engine 414 outputs the DFT result through the output staging buffer 416 over path 476 to the output interface streamer 430, which is turn streams the result to the buffer 432. The buffer 432 then outputs the DFT result to a downstream entity.

Thus, the method 1200 illustrates a method for operating a programmable vector processor having a configurable vector mixed-radix engine with iterative pipeline in accordance with embodiments of the invention. In an exemplary embodiment, the method is computes an N-point DFT as described above. In another exemplary embodiment, the method computes an N-point IDFT. For example, to compute the IDFT, at block 1210, the twiddle factors are adjusted (e.g., sign change) such that the result is an IDFT. Accordingly, the method 1200 operates to compute either a DFT or an IDFT in accordance with the exemplary embodiments.

Embodiments for Greater Efficiency

Fifth generation (5G) communication systems need to support many configurations having different DFT/IDFT sizes with mixed radixes and demanding very high data throughput in real-time processing. Table 1 shows an exemplary summary of DFT/IDFT sizes used in 5G communication systems. Because of the requirement for scalability, the sizes can range from small sizes of a sub physical resource block (PRB), such as {2, 3, 6, or 9}-point DFT to a few RB sizes such as {12, 24, or 36}-point DFT to a very large size 3240-point DFT.

TABLE 1

Summary of DFT/IDFT size in 5G.

| Index | 55 | 54 | 53 | 52 | 51 | 50 | 49 |
|---|---|---|---|---|---|---|---|
| $N_{RB}^{UL}$ | ½ | ¼ | ⅙ | 270 | 256 | 250 | 243 |
| N_DFT | 6 | 3 | 2 | 3240 | 3072 | 3000 | 2916 |
| Index | 48 | 47 | 46 | 45 | 44 | 43 | 42 |
| $N_{RB}^{UL}$ | 240 | 225 | 216 | 200 | 192 | 180 | 162 |
| N_DFT | 2880 | 2700 | 2592 | 2400 | 2304 | 2160 | 1944 |
| Index | 41 | 40 | 39 | 38 | 37 | 36 | 35 |
| $N_{RB}^{UL}$ | 160 | 150 | 144 | 135 | 128 | 125 | 120 |
| N_DFT | 1920 | 1800 | 1728 | 1620 | 1536 | 1500 | 1440 |

TABLE 1-continued

Summary of DFT/IDFT size in 5G.

| Index | 34 | 33 | 32 | 31 | 30 | 29 | 28 |
|---|---|---|---|---|---|---|---|
| $N_{RB}^{UL}$ | 108 | 100 | 96 | 90 | 81 | 80 | 75 |
| N_DFT | 1296 | 1200 | 1152 | 1080 | 972 | 960 | 900 |
| Index | 27 | 26 | 25 | 24 | 23 | 22 | 21 |
| $N_{RB}^{UL}$ | 72 | 64 | 60 | 54 | 50 | 48 | 45 |
| N_DFT | 864 | 768 | 720 | 648 | 600 | 576 | 540 |
| Index | 20 | 19 | 18 | 17 | 16 | 15 | 14 |
| $N_{RB}^{UL}$ | 40 | 36 | 32 | 30 | 27 | 25 | 24 |
| N_DFT | 480 | 432 | 384 | 360 | 324 | 300 | 288 |
| Index | 13 | 12 | 11 | 10 | 9 | 8 | 7 |
| $N_{RB}^{UL}$ | 20 | 18 | 16 | 15 | 12 | 10 | 9 |
| N_DFT | 240 | 216 | 192 | 180 | 144 | 120 | 108 |
| Index | 6 | 5 | 4 | 3 | 2 | 1 | 0 |
| $N_{RB}^{UL}$ | 8 | 6 | 5 | 4 | 3 | 2 | 1 |
| N_DFT | 96 | 72 | 60 | 48 | 36 | 24 | 12 |

Figure 13:
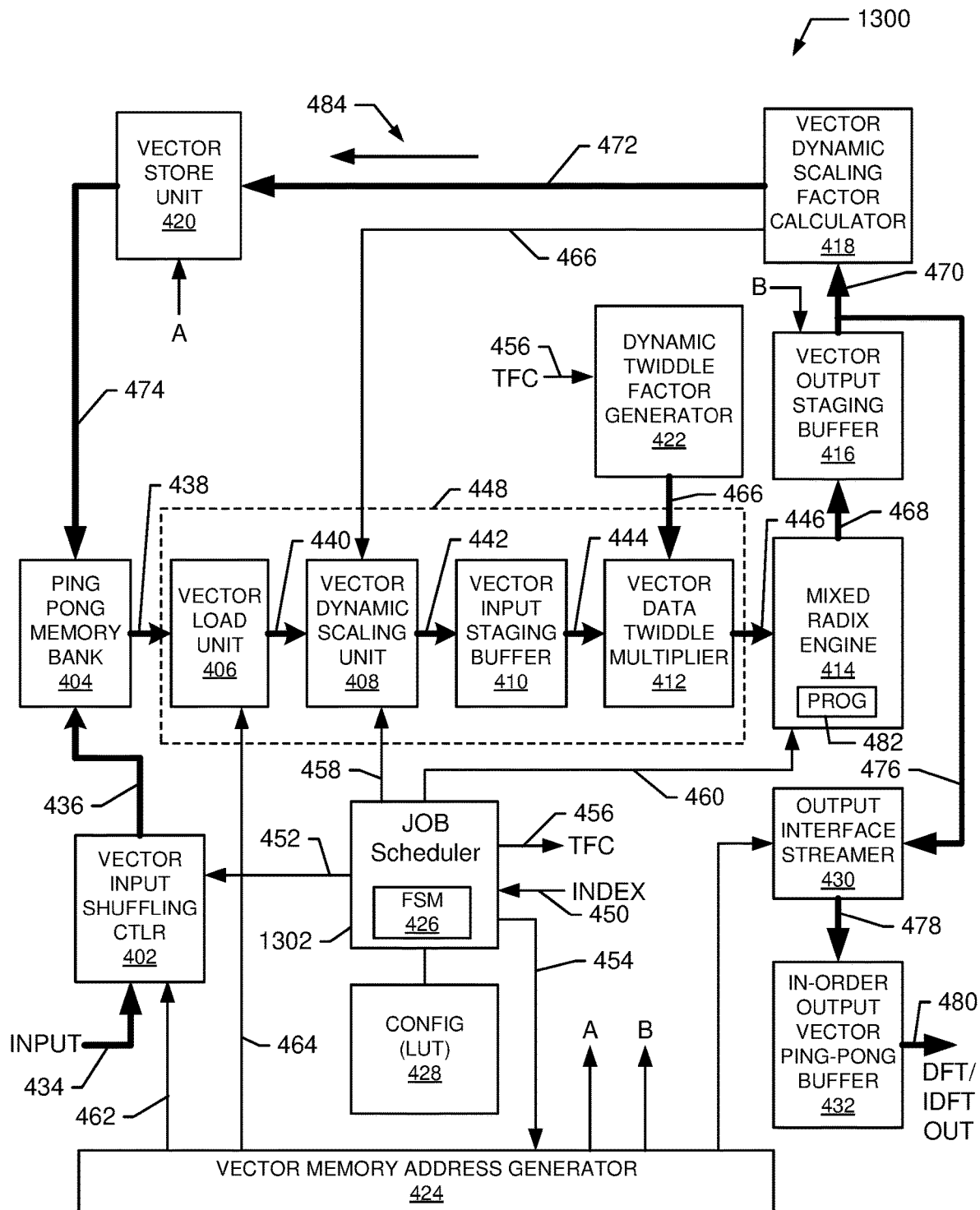
FIG. 13 shows an alternative exemplary embodiment of a DFT/IDFT engine based on the iterative use of a vector radix data path.

A vector programmable DFT/IDFT processor architecture is described herein that iteratively reuses a single pipelined common vector data-path for all possible combinations of mixed-radix DFT/IDFTs, yet still achieves streaming in/output data throughput of multiple samples/cycle with much less logic utilization than conventional systems. The programmable DFT/IDFT processor architecture is shown in FIG. 4 and includes the following major components.
  1. Vector Input Shuffling Controller (402)
  2. Vector Load Unit (406) and Vector Store Unit (420)
  3. Ping (Pi)-Pong (Pa) Memory Bank (404)
  4. Programmable Vector Mixed-radix engine Data-path (414)
  5. Input Staging Buffer Registers (410)
  6. Output Interface Streamer (430)
  7. Vector Dynamic Scaling Factor Calculator (418)
  8. Vector Dynamic Scaling Unit (408)
  9. Dynamic Vector Twiddle Factor Generator (422)
Job Scheduler FIG. 13 shows an alternative exemplary embodiment of a DFT/IDFT engine based on the iterative use of a vector radix data path. In exemplary embodiments, a job scheduler 1302 schedules jobs to control how the DFT/IDFT engine is called when multiple jobs are to be processed in a real-time system, for example, as in a 5G communication system. In such a high-speed system, it is desirable to utilize the mixed radix data path engine 414 with very high utilization efficiency. To achieve this, exemplary embodiments of the job scheduler 1302 provide job level pipelines that schedule (or assign) same size jobs in a back to back order using the ping-pong memory bank (buffers) 404.

In an exemplary embodiment, the job scheduler 1302 includes the finite state machine 426. Thus, in exemplary embodiments, the job scheduler 1302 provides job scheduling functions to increase efficiency and all the functions of the FSM 426 described herein.

In an exemplary embodiment, the job scheduler 1302 is provided by the DFT/IDFT component 1130 that is coupled to bus 1111 and is configured to provide a high-speed programmable vector processor having a configurable vector mixed-radix engine with iterative pipeline in accordance with embodiments of the invention. For example, DFT/IDFT 1130 can be configured to include the PVP 1300 shown in FIG. 13. The DFT/IDFT component 1130 can be hardware, hardware executing software, firmware, or a combination of hardware and firmware. For example, in an exemplary embodiment, the component 1130 operates to provide a job scheduler to schedule jobs to be efficiently computed by a programmable vector processor having a configurable vector mixed-radix engine with iterative pipeline. Accordingly, the component 1130 may also operate to compute either DFT or IDFT values.

Figure 14:
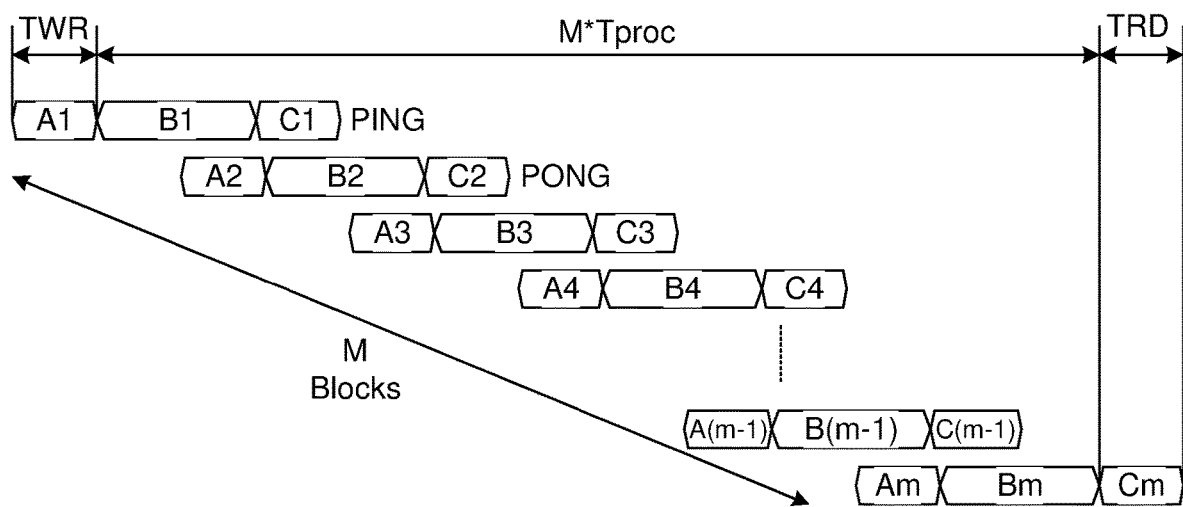
FIG. 14 shows an exemplary processing pipeline that illustrates processing latencies associated with a vector processing pipeline.

FIG. 14 shows an exemplary processing pipeline that illustrates processing latencies associated with a vector processing pipeline. For example, each job that enters the pipeline shown in FIG. 14 has an input phase (A), a processing phase (B), and an output phase (C). For example, the first job is processed using the ping half of the memory bank 404 and the next job is processed using the pong half of the memory bank 404. It will be assumed that there is a total of "M" jobs (or blocks) to be processed. Mathematically, when the radix engine 414 is always occupied, the processing throughput for one feed to the vector engine can reach (single-instruction-multiple-data) SIMD-samples/cycle for each vector load, where SIMD is the bandwidth of the vector processing engine 414. In the above example, the bandwidth of the vector processing engine can be 12-samples/cycle to stream-in data into the radix engine 414. This can lead to very high processing throughput that is based on the multi-stage factorization scheme for a large DFT size. For example, for a 2592-point DFT, if the multi-stage factorization is (6, 6, 6, 3, 4), where the number sequence is the radix size for each stage, the number of small size DFTs is (432, 432, 432, 864, 648). Because of the 12-way SIMD, the number of cycles for each iteration is 216 cycles=2592/12. This leads to the total processing latency of 216*5=1080 cycles (i.e., processing throughput of 2592/1080=2.4 samples/cycle).

As illustrated in the processing pipeline shown in FIG. 14, the total latency for M blocks of DFT/IDFT for different scenarios are summarized as follows, where TProc is the total processing time of the radix engine 414 to process one block, TWR is the time to read a block from the ping-pong memory 404 and write (load) it into the data pipeline, and TRD is the time to read the data from the radix engine and out of the feedback pipeline to the ping-pong buffer.

When TProc>(TRD+TWR), there is no overlap of the input and output. The overall throughput is determined by the TProc. The input/output buffer can share the same buffer as the internal buffer. The ping-pong buffer 404 will be used to provide task level pipeline operations.

When TProc<(TRD+TWR), there is overlap of input and output. If there is no separate output buffer, then the overall latency T_total=(TWR+M*(TWR+TRD)+TRD)=(M+1)*(TWR+TRD).

If a separate output buffer is used, and TProc>max (TWR, TRD), the process can start writing to the output buffer in the last stage. The ping-pong output buffer can be avoided. The total latency would be T_total=TWR+M*TProc+TRD. Because the first stages fetch the data from the same memory bank, the data must be staged in a small matrix register file to prepare for the radix operator.

Figure 15:
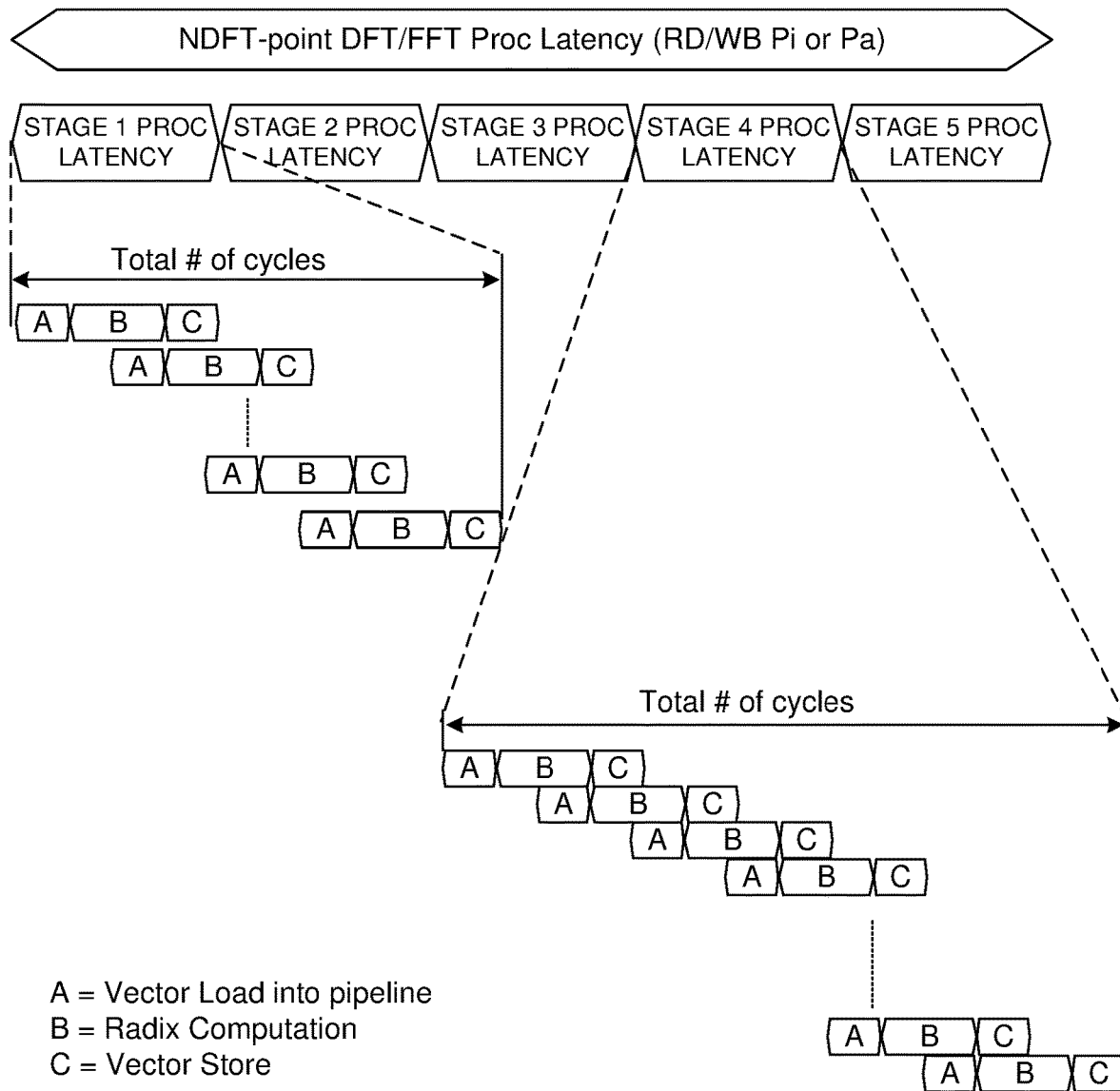
FIG. 15 shows an exemplary timing diagram that illustrates the processing latency at each processing stage of a processing pipeline that is computing an N-point DFT.

FIG. 15 shows an exemplary timing diagram that illustrates the processing latency at each processing stage of a processing pipeline that is computing an N-point DFT. In an exemplary embodiment, the pipeline is only stalled for a few cycles in the transition from one stage to another stage. The overhead is negligible compared with the number of radix operations pipelined within one stage. Overall, it is clear that the number of cycles is determined by the number of vector radix operators and the number of radix operations per stage. In general, for the architecture choice of FFT, the overall processing latency can be expressed as the following.

$$\sum_{R(i)\neq\{6,8\}} \frac{N}{2R(i)} + \sum_{R(i)=\{6,8\}} \frac{N}{R(i)}$$

However, the above calculation is assuming that the radix processing engine is processing SIMD-samples/cycle without any stall, or bubble in the pipeline. In a real implementation, the radix engine data path pipeline needs to be designed in multiple cycles.

Referring again to FIG. 5, a block diagram illustrating a detailed exemplary embodiment of a programmable vector mixed-radix processor 500 is shown. With reference to FIG. 5, it can be shown that an exemplary timing diagram that could lead to a data path pipeline with multiple cycles of latency, e.g., {s0, s1, s2, s3, s4, s5}. For example, when there is a transition between different stages of different radix sizes, there will be inevitable stage transition bubbles that can stall the pipeline due to the transition. For large block size, this transition bubble is negligible compared with the number of processing cycles within the same radix size. For example, for the 2592-point DFT, the processing latency within one stage of same radix is 216 cycles, while the stage transition may introduce an overhead of 5 cycles in the pipeline ramping up process. Thus, the large DFT sizes, the stage transition is very short compared with the processing latency in each stage.

Typically, one block DFT is considered as a single job. For each job, only the data for this block is input to the ping-pong buffer and processed in multiple stages. The next block has to wait for the multiple stage computation of this block DFT to complete before starting its 1$^{st}$ stage calculation. Therefore, for the small sizes, if the same block-by-block job scheduling method is used, the stage transition overhead dominates the overall latency, which will stall the radix engine pipeline and lower the SIMD efficiency significantly. For example, consider a 36-point DFT with (3, 3, 4) factorization. The calculated processing latency in each stage is only 3 cycles/stage, but the stage transition overhead can be 33 cycles, leading to total latency of 3*3+33=42 cycles and thereby only achieving ¼ of the design target.

In various exemplary embodiments, the job scheduler 1302 utilizes the repetitive symbol pattern associated with the same-size DFT jobs within a selected time frame to diminish the stage transition bubble and bring back the targeted SIMD efficiency. In an exemplary embodiment, for an M-block back-to-back job scheduling of the same block size, if the stage transition overhead is N cycles, the overhead can be diminished to be only N/M cycles. For the example above, if M=24 jobs, then the overall latency will be (3*3*24+33)=249 cycles for all the 24 jobs instead of (3*3+33)*24=1008 cycles. This achieves 4 times speedup with a simple change of operation provided by the job scheduler 1302.

Figure 16:
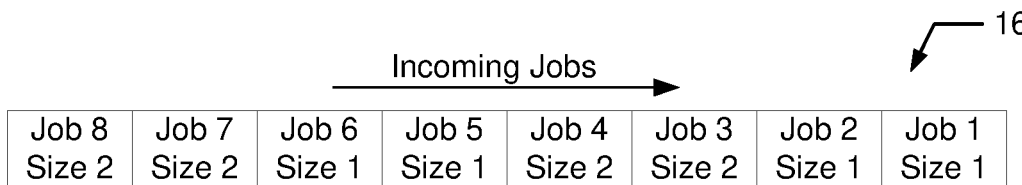
FIG. 16 shows a diagram that illustrates efficient job scheduling provided by exemplary embodiments of the job scheduler and corresponding methods.

FIG. 16 shows a diagram that illustrates efficient job scheduling provided by exemplary embodiments of the job scheduler 1302 and corresponding methods described herein. In exemplary embodiments, DFT/IDFT jobs are scheduled within the mixed-radix engine data path to share the stage transition bubble that is inevitable for all multiple stage computations.

As an example, the scheduling of jobs having one of two DFT sizes is illustrated. An incoming stream of job 1602 is received by the job scheduler 1302. Each job has a DFT size of either size 1 or size 2. The DFT sizes are small such that efficiency improvements can be obtained by processing the jobs in accordance with the exemplary embodiments. The scheduler 1302 first organizes the jobs by size, as illustrated at 1604. The scheduler 1302, then bundles the jobs together so that the incoming data is arranged to form mega-jobs and stored in one side of the ping-pong buffer 404, as shown at 1606. In this example, there is a mega-job for each of the two DFT sizes.

Figure 17:
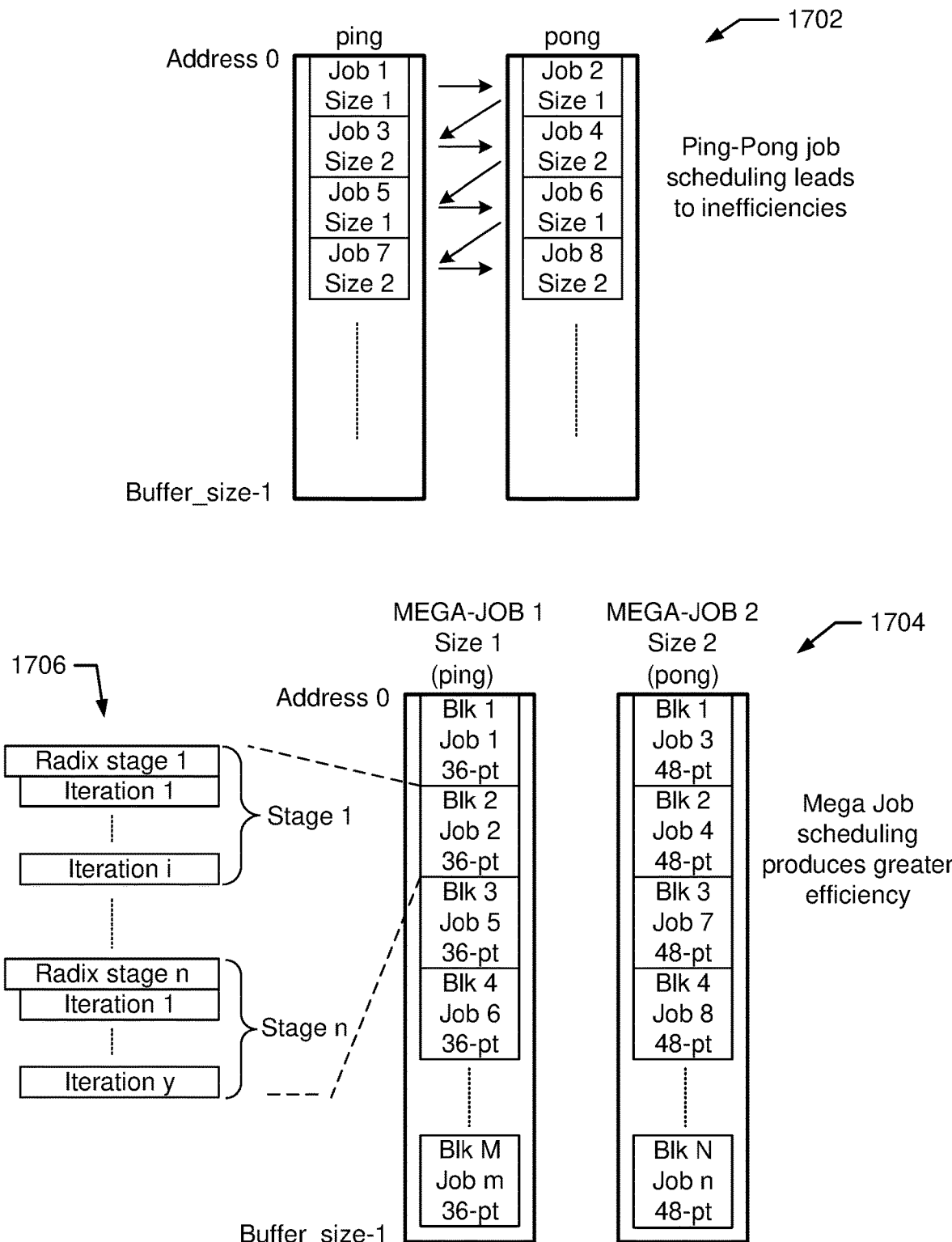
FIG. 17 shows an exemplary embodiment that illustrates how data associated with mega-jobs are loaded into a ping-pong memory bank.

FIG. 17 shows an exemplary embodiment that illustrates how the data associated with the mega-jobs are loaded into the ping-pong memory bank 404. As illustrated at 1702, one technique used to load jobs in the ping-pong memory is by loading the data for each job in one side of the ping-pong memory bank 404, and then alternating by loading consecutive jobs back and forth in the two halves of the ping-pong memory bank 404. This technique leads to inefficiencies since each small job has overhead transactions that are incurred when the radix engine 414 is configured for each radix computation.

In an exemplary embodiment illustrated at 1704, each mega-job is loaded into one half of the ping-pong memory buffer 404. For example, it will be assumed that DFT jobs having size 1 are 36-pt DFTs and size 2 are 48-pt DFTs. In this configuration, multiple jobs of the same size are sequentially processed out of the same buffer so that overhead transactions to set up the radix engine 414 and the overhead for stage transition in small size DFTs are reduced or minimized leading to greater efficiency. It should be noted that each job identifies the stages of radix computations to be performed and the number of computation iterations performed at each stage, as illustrated at 1704.

A job scheduler that schedules jobs to be efficiently processed by a vector programmable DFT/IDFT processor architecture is described herein that iteratively reuses a single pipelined common vector data-path for all possible combinations of mixed-radix DFT/IDFTs, yet still achieves streaming in/output data throughput of multiple samples/cycle with much less logic utilization than conventional systems. The programmable DFT/IDFT processor architecture is shown in FIG. 13 and includes the following major components.

1. A job scheduler 1302 that provides a write procedure and associated memory addressing mechanism to store the input data of multiple jobs into the ping-pong buffer 404.
2. A vector load circuit 406 to load the data of one stage processing from the memory of multiple sub-jobs in the ping-pong buffer into the vector pipeline.
3. A vector radix engine 414 that processes the data of all the jobs in a mega-job within an iteration stage before moving to the next stage.
4. A vector store circuit 420 and associated memory addressing mechanism that stores the intermediate result of multiple jobs from the vector radix engine 414 to the ping-pong buffer 404.
5. A write out circuit 430 and addressing mechanism that streams out the last stage result of multiple jobs into the output buffer.
6. A job dispatcher 432 that unpacks the result of multiple jobs to their own data consumer.

Figure 18:
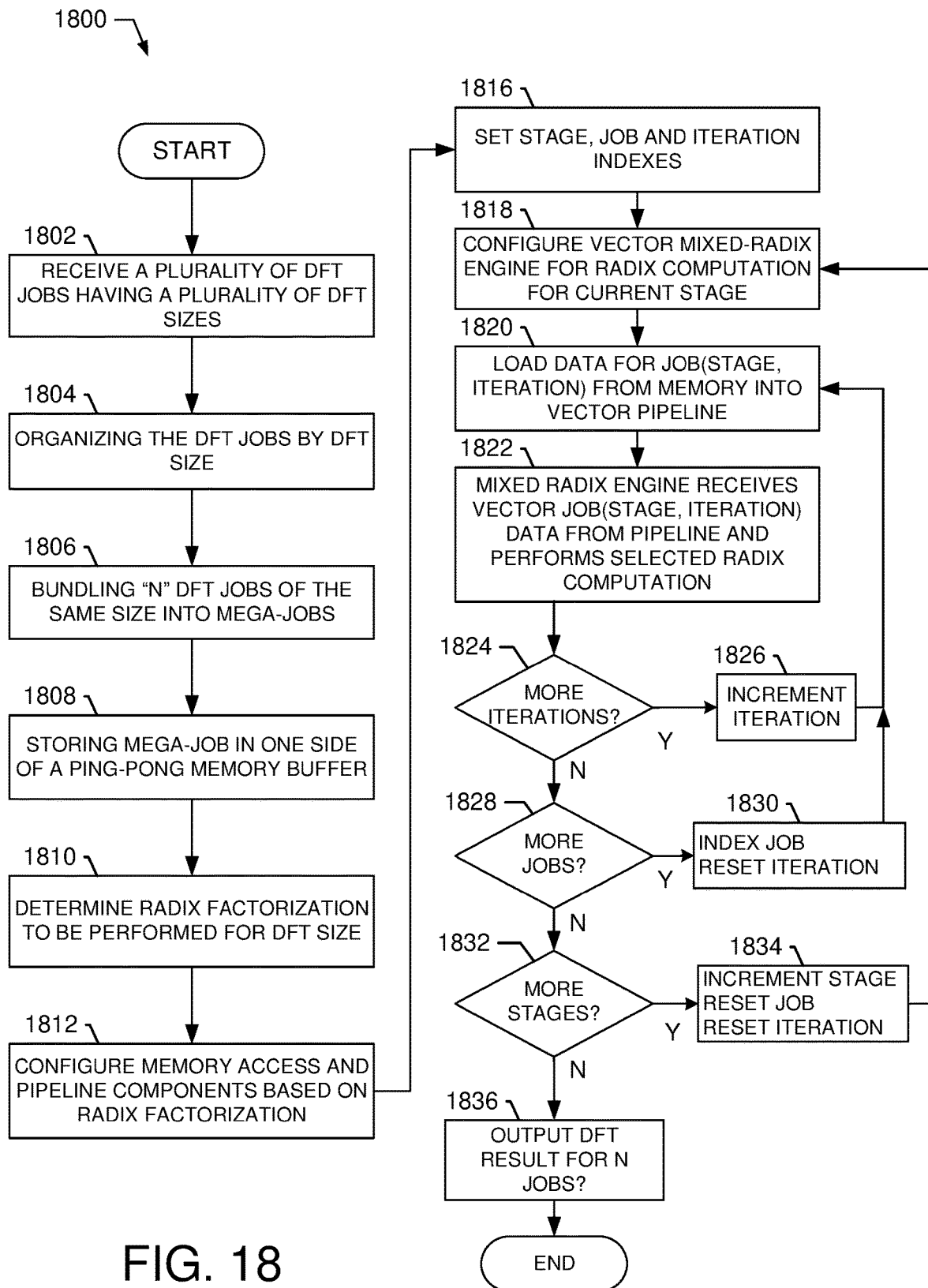
FIG. 18 illustrates an exemplary method for operating a job scheduler to schedule jobs to be computed by a programmable vector processor having a configurable vector mixed-radix engine with iterative pipeline.

FIG. 18 illustrates an exemplary method 1800 for operating a job scheduler to schedule jobs to be efficiently computed by a programmable vector processor having a configurable vector mixed-radix engine with iterative pipeline. For example, the method 1800 is suitable for use with the job scheduler 1302 and the PVP 1300 shown in FIG. 13.

At block 1802, a plurality of DFT jobs are received. The DFT jobs have a plurality of sizes. For example, the jobs are received by the job scheduler 1302.

At block 1804, the DFT jobs are organized by size. For example, the job scheduler 1302 organizes the DFT jobs by size as illustrated at 1604.

At block 1806, the DFT jobs are bundles by size to form mega-jobs. For example, the job scheduler 1302 bundles the DFT jobs by size to form mega-jobs as illustrated at 1606. In an exemplary embodiment, it is a design choice or configuration parameter associated with the job scheduler 1302 to determine what size jobs are to be bundled into a mega-job.

At block 1808, data associated with a mega-job is stored in one half of the ping-pong buffer. For example, the job scheduler 1302 stores the data associated with a mega-job in one half of the ping-pong buffer 404 as illustrated in FIG. 17.

At block 1810, a radix factorization is determined for the jobs in a mega-job. For example, a radix factorization is determined to compute DFT/IDFT associated with the jobs in a mega-job. For example, the index value 450 associated with jobs in a mega-job for the N-point DFT to be computed is received at the state machine controller 426, which accesses the configuration information 428 to determine a radix factorization which can be used to compute the DFT of those jobs. For example, if all the jobs in a mega-job are for 36-point DFT computation, then the determined radix factorization may be (3, 3, 4) identifying three stages of radix computation to be performed where the first stage is radix3, the second stage is radix3, and the third stage is radix4. The number of iterations for each stage is also determine to obtain the most efficient utilization of the programmable radix engine. For 12-SIMD capacity, four radix3 operations can be performed for each iteration of the first and second stages, and three radix4 operations can be performed for each iteration of the third stage.

At block 1812, memory accesses and pipeline components are configured based on the radix factorization. For example, based on the determined radix factorization, the state machine controller 426 determines how many iterations and radix computations it will take to compute the desired DFT for each job in a mega-job. The state machine 426 outputs control signals 452 to the shuffling controller 402 to control how input data is stored in the memory 404. The state machine 426 outputs control signals 454 to control how memory addresses and control signals are generated by the address generator 424. These addresses and control signals are used to control how data is transmitted through the vector pipeline 448 and the vector feedback path 484 for each iteration of the DFT computation.

At block 1816, indexes for stage, job, and iteration are initialized. For example, the stage index is set for the first stage, the job index is set for the first job, and the iteration is set for the first iteration.

At block 1818, the configurable vector mixed-radix engine is configured to perform a first radix computation for the first stage of the radix factorization for the mega-job. For example, the state machine 426 outputs radix control signals 460 to the program controller and the programmer 514 uses these signals to configure the stages (or sections) (s0-s5) (e.g., vector engines) of the mixed-radix engine 500 to perform the selected radix computation, such as a radix3, radix4, radix5, or radix6 computation. For example, the stages (or sections of the engine 500) are configured to one of the configurations shown in FIG. 10 to perform the selected radix computation.

At block 1820, vector data is loaded from the memory into the vector pipeline. For example, input data of the mega-job stored in one half of the ping-pong memory 404 is read out of the memory and written into the pipeline 448. In an exemplary embodiment, the vector data is written into the pipeline 448 at a rate of 12 samples per cycle (12-SIMD).

At block 1822, the selected radix computation is performed. For example, the mixed-radix engine 500 performs the selected radix computation (such as a radix3, radix4, radix5, or radix 6 computation) as configured by the programmer 514. It should be noted that the vector data received at the radix engine 500 may have been processed by the other functions in the vector pipeline, such as by the scaling unit 408 or the twiddle multiplier 412. Those operations are described in other sections of this disclosure.

At block 1824, a determination is made as to whether additional iterations of radix computation are required to complete the computation of the current stage for the current job. If additional iterations are required, the method proceeds to block 1826. If no additional iterations are required, the method proceeds to block 1828.

At block 1826, the iteration index is incremented. For example, it has been determined at block 1824 that the current stage of the current job requires multiple iterations, so the iteration index is incremented and the method proceeds to block 1820 to load the data for the next iteration.

At block 1828, a determination is made as to whether additional jobs in the current stage of the current mega-job to be completed. For example, the current mega-job may include a plurality of 36-point DFT jobs to be computed. If there are additional jobs to be computed in the current stage, the method proceeds to block 1830. If there are no additional jobs to be computed in the current stage of the current mega-job, the method proceeds to block 1832.

At block 1830, the job index is incremented and the iteration index is reset. For example, it has been determined at block 1828 that there are additional jobs to be computed in the current stage of the current mega-job, so the job index is incremented and the iteration index is reset. The method proceeds to block 1820 to load the data for the first iteration of the next job in the current stage.

At block 1832, a determination is made as to whether additional stages in the current mega-job to be completed. For example, the current mega-job may include a plurality of 36-point DFT jobs to be computed. There are three stages in the factorization (i.e., 3, 3, 4) to be computed. If there are additional stages to be computed in the current mega-job, the method proceeds to block 1834. If there are no additional stages to be computed in the current mega-job, the method proceeds to block 1836.

At block 1834, the stage index is incremented and the job and iteration indexes are reset. For example, it has been determined at block 1832 that there are additional stages to be computed in the current mega-job, so the stage index is incremented and the job and iteration indexes are reset. The method proceeds to block 1818 to configure the radix engine for the radix computation for the next stage.

At block 1836, the N-point DFT for all the jobs in the current mega-job are output. For example, in one embodiment, the mixed radix engine 414 outputs the DFT results for each job through the output staging buffer 416 over path 476 to the output interface streamer 430, which is turn streams the result to the buffer 432. The buffer 432 then outputs the DFT result to a downstream entity.

Thus, the method 1800 illustrates a method for operating a programmable vector processor having a configurable vector mixed-radix engine with iterative pipeline in accordance with embodiments of the invention. In an exemplary embodiment, the method efficiently computes a plurality of N-point DFT jobs that have been grouped into a mega-job as described above. For example, the mega-job is stored in one half of a ping-pong buffer 404, which enables efficient access to the data and the performance of radix computations while utilizing reduced or minimal overhead to reconfigure the radix engine.

In another exemplary embodiment, the method computes a plurality of N-point IDFT jobs. For example, to compute an IDFT job, the twiddle factors are adjusted (e.g., sign change) such that the result is an IDFT.

Accordingly, the method 1800 operates efficiently to compute either a DFT or an IDFT jobs in accordance with the exemplary embodiments. It should be noted that the operations provided in the method 1800 may be rearranged, modified, deleted, added to, or otherwise changed within the scope of the exemplary embodiments.

While particular embodiments of the present invention have been shown and described, it will be obvious to those skilled in the art that, based upon the teachings herein, changes and modifications may be made without departing from these exemplary embodiments of the present invention and their broader aspects. Therefore, the appended claims are intended to encompass within their scope all such changes and modifications as are within the true spirit and scope of these exemplary embodiments of the present invention.

What is claimed is:

1. A method of processing discrete Fourier transform ("DFT") for a wireless communication network, the method comprising:
   receiving a plurality of DFT jobs via a wireless network and identifying a DFT of point size associated with each of the plurality of DFT jobs;
   separating first DFT jobs from the plurality of DFT jobs in accordance with a first point size and second DFT jobs from the plurality of DFT jobs in accordance with a second point size;
   bundling the first DFT jobs with the first point size to form a first mega-job; and
   loading the first mega-job into an iterative vector pipeline upon determining a radix factorization in response to the first point size.

2. The method of claim 1, further comprising computing radix computations for the first DFT jobs in the first mega-job.

3. The method of claim 2, wherein computing radix computation further includes configuring a mixed radix engine to perform a selected one of radix3, radix4, radix5, and radix6 computations for each stage.

4. The method of claim 1, further comprising outputting DFT results for the first DFT jobs.

5. The method of claim 1, further comprising generating a second mega-job bundling at least a portion of the second DFT jobs with the second point size in a predefined second sequence within the second mega-job.

6. The method of claim 1, further comprising storing the first mega-job at a first half-side of a ping-pong memory bank.

7. The method of claim 1, further comprising storing the second mega-job at a second half-side of the ping-pong memory bank.

8. The method of claim 1, further comprising performing an iteration to determine a radix computation in accordance with the first point size.

9. The method of claim 8, wherein performing an iteration includes performing a radix computation relating to the first mega-job in a vector data path pipeline.

10. The method of claim 9, wherein performing an iteration includes storing a radix result of the radix computation back into the source location in one side of the ping-pong memory buffer if a current iteration is not a last iteration.

11. The method of claim 10, wherein performing an iteration includes outputting the radix result if the current iteration is the last iteration.

12. The method of claim 1, further comprising generating one or more radix engine control signals to program a mixed radix engine for providing DFT calculations based on the radix factorization.

13. A method of processing wireless data formatted in discrete Fourier transform ("DFT") or inverse DFT ("IDFT") comprising:
   receiving a plurality of IDFT jobs via a wireless data transmission;
   grouping first IDFT jobs based on a first point size and group second IDFT jobs based on a second point size;
   generating a first mega-job bundling the first IDFT jobs and a second mega-job bundling the second IDFT jobs;
   loading the first mega-job into an iterative vector pipeline upon determining a radix factorization in response to the first point size; and
   computing radix computations for the first IDFT jobs in the first mega-job.

14. The method of claim 13, wherein computing radix computation further includes configuring a mixed radix engine to perform a selected one of radix3, radix4, radix5, and radix6 computations for each stage.

15. The method of claim 13, further comprising outputting IDFT results for the first IDFT jobs.

16. The method of claim 13, further comprising storing the first mega-job at a first portion of a memory bank and storing the second mega-job at second portion of the memory bank.

17. The method of claim 13, further comprising performing a programmed radix computation in response to the first mega-job and the first point size.

18. An apparatus of processing discrete Fourier transform ("DFT") for a wireless communication network, comprising:
   means for receiving a plurality of DFT jobs via a wireless network and means for identifying a DFT of point size associated with each of the plurality of DFT jobs;
   means for separating first DFT jobs from the plurality of DFT jobs in accordance with a first point size and second DFT jobs from the plurality of DFT jobs in accordance with a second point size;
   means for bundling the first DFT jobs with the first point size to form a first mega-job; and
   means for loading the first mega-job into an iterative vector pipeline upon determining a radix factorization in response to the first point size.

19. The apparatus of claim 18, further comprising means for computing radix computations for the first DFT jobs in the first mega-job.

20. The apparatus of claim 19, wherein computing radix computation further includes configuring a mixed radix engine to perform a selected one of radix3, radix4, radix5, and radix6 computations for each stage.

21. The apparatus of claim 18, further comprising means for outputting DFT results for the first DFT jobs.

22. The apparatus of claim 18, further comprising means for generating a second mega-job bundling at least a portion of the second DFT jobs with the second point size in a predefined second sequence within the second mega-job.

23. The apparatus of claim 18, further comprising means for storing the first mega-job at a first half-side of a ping-pong memory bank.

24. The apparatus of claim 18, further comprising means for storing the second mega-job at a second half-side of the ping-pong memory bank.

* * * * *